(12) United States Patent  
Bumgarner et al.

(10) Patent No.: US 11,190,856 B2
(45) Date of Patent: Nov. 30, 2021

(54) SYNCHRONIZING CONTENT AND METADATA

(71) Applicant: Apple Inc., Cupertino, CA (US)

(72) Inventors: William M. Bumgarner, San Jose, CA (US); Blake Seely, San Francisco, CA (US); Christopher L. Oklota, San Francisco, CA (US); Dale A. Taylor, San Carlos, CA (US); Eswar Priyadarshan, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/723,985

(22) Filed: Dec. 20, 2019

(65) Prior Publication Data

US 2020/0128292 A1 Apr. 23, 2020

Related U.S. Application Data

(63) Continuation of application No. 14/814,193, filed on Jul. 30, 2015, now abandoned.
(Continued)

(51) Int. Cl.
*H04N 21/8547* (2011.01)
*H04N 21/234* (2011.01)
(Continued)

(52) U.S. Cl.
CPC ... *H04N 21/8547* (2013.01); *H04N 21/23418* (2013.01); *H04N 21/23424* (2013.01);
(Continued)

(58) Field of Classification Search
CPC ....... H04N 21/23418; H04N 21/23424; H04N 21/242; H04N 21/26258; H04N 21/4307;
(Continued)

(56) References Cited

U.S. PATENT DOCUMENTS 5,483,261 A 1/1996 Yasutake
5,488,204 A 1/1996 Mead et al.
(Continued)

FOREIGN PATENT DOCUMENTS

| EP | 2430833 A2 | 3/2012 |
| JP | 2000-163031 A | 6/2000 |
| JP | 2002-342033 A | 11/2002 |

OTHER PUBLICATIONS

Final Office Action received for U.S. Appl. No. 14/812,976, dated Oct. 13, 2017, 25 pages.
(Continued)

*Primary Examiner* — Dominic D Saltarelli
(74) *Attorney, Agent, or Firm* — Kubota & Basol LLP

(57) ABSTRACT

Time-based events and other metadata that can be added to a media stream to enable downstream systems to enhance the viewing experience are disclosed. The events are given time attributes that establish their location in the media stream so that regardless of where the playhead is located within the media stream, the events that are active at that point in time can be identified and synchronized with the playhead. In addition, a master clock can be used to update a stream timeline associated with the media stream to account for differences between the expected and actual duration of advertisements inserted into the media stream.

30 Claims, 19 Drawing Sheets

Related U.S. Application Data

(60) Provisional application No. 62/057,768, filed on Sep. 30, 2014, provisional application No. 62/057,651, filed on Sep. 30, 2014.

(51) Int. Cl.
*H04N 21/845* (2011.01)
*H04N 21/262* (2011.01)
*H04N 21/242* (2011.01)
*H04N 21/43* (2011.01)
*H04N 21/44* (2011.01)
*H04N 21/482* (2011.01)
*H04N 21/81* (2011.01)

(52) U.S. Cl.
CPC ..... *H04N 21/242* (2013.01); *H04N 21/26258* (2013.01); *H04N 21/4307* (2013.01); *H04N 21/44008* (2013.01); *H04N 21/44016* (2013.01); *H04N 21/4825* (2013.01); *H04N 21/812* (2013.01); *H04N 21/8456* (2013.01)

(58) Field of Classification Search
CPC ....... H04N 21/44008; H04N 21/44016; H04N 21/4825; H04N 21/812; H04N 21/8456; H04N 21/8547
USPC .......................................................... 725/32
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 5,931,908 A | 8/1999 | Gerba et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,698,020 B1* | 2/2004 | Zigmond | H04N 21/812 725/34 |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,214,429 B2 | 7/2012 | Chidel et al. | |
| 8,479,122 B2 | 7/2013 | Hotelling et al. | |
| 8,526,782 B2 | 9/2013 | Kaiser et al. | |
| 8,775,501 B2 | 7/2014 | Chidel et al. | |
| 8,935,666 B2 | 1/2015 | Miller, III | |
| 10,231,033 B1 | 5/2019 | Bumgarner et al. | |
| 2001/0052133 A1* | 12/2001 | Pack | H04N 21/435 725/109 |
| 2002/0042920 A1 | 4/2002 | Thomas et al. | |
| 2003/0033449 A1 | 2/2003 | Frantz et al. | |
| 2003/0110171 A1 | 6/2003 | Ozer et al. | |
| 2004/0267940 A1 | 12/2004 | Dideriksen et al. | |
| 2005/0138137 A1 | 6/2005 | Encarnacion et al. | |
| 2005/0273515 A1 | 12/2005 | Bodlaender | |
| 2006/0197753 A1 | 9/2006 | Hotelling | |
| 2007/0022463 A1 | 1/2007 | Kelly | |
| 2007/0192818 A1 | 8/2007 | Bourges-Sevenier et al. | |
| 2007/0263860 A1 | 11/2007 | Buchen et al. | |
| 2008/0015932 A1 | 1/2008 | Haeuser et al. | |
| 2008/0034392 A1 | 2/2008 | McCarthy et al. | |
| 2009/0055742 A1 | 2/2009 | Nordhagen | |
| 2009/0259957 A1 | 10/2009 | Slocum et al. | |
| 2009/0317061 A1 | 12/2009 | Jung et al. | |
| 2010/0014825 A1 | 1/2010 | Curtis et al. | |
| 2010/0046752 A1 | 2/2010 | Fahrny et al. | |
| 2010/0259559 A1 | 10/2010 | Schneider | |
| 2010/0293190 A1 | 11/2010 | Kaiser et al. | |
| 2011/0231519 A1 | 9/2011 | Luby et al. | |
| 2011/0252118 A1 | 10/2011 | Pantos et al. | |
| 2012/0017004 A1 | 1/2012 | Furbeck | |
| 2012/0066673 A1 | 3/2012 | Miller, III | |
| 2012/0117534 A1 | 5/2012 | Hershenson et al. | |
| 2012/0185905 A1* | 7/2012 | Kelley | H04N 21/23614 725/109 |
| 2012/0254365 A1 | 10/2012 | Adimatyam et al. | |
| 2012/0254454 A1 | 10/2012 | Margush et al. | |
| 2013/0014155 A1 | 1/2013 | Clarke et al. | |
| 2013/0129303 A1* | 5/2013 | Lee | H04N 21/4126 386/201 |
| 2013/0166655 A1 | 6/2013 | Martin | |
| 2013/0254664 A1 | 9/2013 | Almstrand et al. | |
| 2013/0311595 A1 | 11/2013 | Milatinovici et al. | |
| 2014/0007057 A1 | 1/2014 | Gill et al. | |
| 2014/0122738 A1 | 5/2014 | Thang et al. | |
| 2014/0181858 A1 | 6/2014 | Kitazato | |
| 2014/0184530 A1 | 7/2014 | Hyun | |
| 2014/0195653 A1 | 7/2014 | Alexander et al. | |
| 2014/0244803 A1 | 8/2014 | Kang et al. | |
| 2014/0344804 A1 | 11/2014 | Ein-Gal et al. | |
| 2015/0040160 A1 | 2/2015 | Melnychenko et al. | |
| 2015/0089552 A1* | 3/2015 | Thompson | H04N 21/4307 725/88 |
| 2015/0264429 A1 | 9/2015 | Winograd et al. | |
| 2015/0289019 A1 | 10/2015 | Merzon et al. | |
| 2015/0372820 A1 | 12/2015 | Schneider et al. | |
| 2016/0073155 A1 | 3/2016 | Subramaniam et al. | |
| 2016/0127781 A1 | 5/2016 | Park | |
| 2016/0241617 A1 | 8/2016 | Jelley et al. | |
| 2019/0182564 A1 | 6/2019 | Bumgarner et al. | |

OTHER PUBLICATIONS

Final Office Action received for U.S. Appl. No. 14/814,193, dated Aug. 21, 2019, 16 pages.
Final Office Action received for U.S. Appl. No. 14/814,193, dated Aug. 23, 2018, 15 pages.
Final Office Action received for U.S. Appl. No. 14/814,193, dated May 18, 2017, 14 pages.
Final Office Action received for U.S. Appl. No. 14/814,230, dated Nov. 28, 2017, 17 pages.
Final Office Action received for U.S. Appl. No. 14/700,076, dated Jun. 16, 2016, 34 pages.
Non-Final Office Action received for U.S. Appl. No. 14/812,976, dated Dec. 30, 2016, 21 pages.
Non-Final Office Action received for U.S. Appl. No. 14/812,976, dated Mar. 25, 2016, 18 pages.
Non-Final Office Action received for U.S. Appl. No. 14/814,193, dated Apr. 5, 2019, 14 pages.
Non-Final Office Action received for U.S. Appl. No. 14/814,193, dated Dec. 29, 2017, 15 pages.
Non-Final Office Action received for U.S. Appl. No. 14/814,193, dated Sep. 9, 2016, 14 pages.
Non-Final Office Action received for U.S. Appl. No. 14/814,230, dated Mar. 23, 2017, 12 pages.
Non-Final Office Action received for U.S. Appl. No. 14/814,287, dated Sep. 25, 2017, 18 pages.
Non-Final Office Action received for U.S. Appl. No. 14/700,076, dated May 16, 2017, 41 pages.
Non-Final Office Action received for U.S. Appl. No. 14/700,076, dated Oct. 15, 2015, 16 pages.
Kaiser et al., U.S. Appl. No. 61/924,200, filed Jan. 6, 2014.
Kaiser et al., U.S. Appl. No. 13/657,520, filed Oct. 22, 2012, titled "Code Execution in Complex Audiovisual Experiences".
Kaiser et al., U.S. Appl. No. 13/742,341, filed Jan. 15, 2013, titled "Associating Media Using Metadata and Controlling Multiple-Device Synchronization and Rendering".
Lee et al., "A Multi-Touch Three Dimensional Touch-Sensitive Tablet", CHI '85 Proceedings, Apr. 1985, pp. 21-25.
Rubine, Dean H., "Combining Gestures and Direct Manipulation", CHI '92, May 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

(56) References Cited

OTHER PUBLICATIONS

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Final Office Action received for U.S. Appl. No. 14/812,976, dated Mar. 13, 2020, 19 pages.
Final Office Action received for U.S. Appl. No. 14/812,976, dated Oct. 1, 2018, 19 pages.
Final Office Action received for U.S. Appl. No. 14/700,076, dated Jan. 24, 2018, 43 pages.
Final Office Action received for U.S. Appl. No. 14/700,076, dated Oct. 3, 2019, 25 pages.
Non-Final Office Action received for U.S. Appl. No. 14/700,076, dated Feb. 27, 2019, 21 pages.
Non-Final Office Action received for U.S. Appl. No. 14/812,976, dated Aug. 8, 2019, 17 pages.
Non-Final Office Action received for U.S. Appl. No. 14/812,976, dated Mar. 28, 2018, 20 pages.
Non-Final Office Action received for U.S. Appl. No. 14/814,230, dated Apr. 5, 2018, 16 pages.
Notice of Allowance received for U.S. Appl. No. 14/814,230, dated Oct. 26, 2018, 18 pages.
Restriction Requirement received for U.S. Appl. No. 14/814,230, dated Dec. 1, 2016, 6 pages.

* cited by examiner

SYNCHRONIZING CONTENT AND METADATA

CROSS REFERENCE TO RELATED APPLICATIONS

This application is a continuation of U.S. application Ser. No. 14/814,193, filed Jul. 30, 2015, which claims the benefit of U.S. Provisional Application No. 62/057,651, filed on Sep. 30, 2014, and U.S. Provisional Application No. 62/057,768, filed on Sep. 30, 2014, the entire disclosures of which are herein incorporated by reference for all purposes.

FIELD OF THE DISCLOSURE

This relates generally to digital media streams, and more particularly, to synchronizing the content of a media stream to event information and other metadata in the media stream, and updating a stream timeline in a media stream in accordance with a master clock.

BACKGROUND OF THE DISCLOSURE

Digital distribution is the delivery of media such as television shows, movies, sports and games in a digital format, often over Internet-based delivery systems. The digital nature of this media allows content creators and content distributors to embed additional information into the digital media. However, it can be difficult to synchronize this additional information during delivery of the digital media.

SUMMARY OF THE DISCLOSURE

Some examples of the disclosure are optionally directed to time-based events and other metadata that can be added to a media stream or utilized with a media stream to enable downstream systems to enhance the viewing and/or listening experience. In some examples, the events or other metadata are optionally given time attributes that establish their location in the media stream so that regardless of where the playhead is located within the media stream, the events that are active at that point in time can be identified and synchronized with the playhead. In some examples, a master clock can be used to update a stream timeline associated with the media stream to account for differences between the expected and actual duration of advertisements inserted into the media stream.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Digital distribution is the delivery of media such as television shows, movies, sports, games, music, and other video or audio programming in a digital format. A video program, for example, often contains a number of events (significant moments or periods of time) such as the start and end of the program, the first appearance of a character, an advertisement, an important plot development, and the like. Events often define regions or intervals of time, such as the beginning and end of a particular scene. Such events are optionally referred to as region-based events, which are different from time-based events (which define discrete moments in time). Although region-based events define regions of time, the region of time is optionally, in some instances, so short as to practically define a discrete moment in time. A user's viewing experience can be enhanced by the presentation of additional content during events, and therefore events can define moments in time when an overlay should be displayed. An overlay is content that is displayed over program images at some point during an event, and can include text, images, video, selection menus, and the like. The overlay is optionally partially see-through, such that it does not completely obscure the image beneath it.

Figure 1:
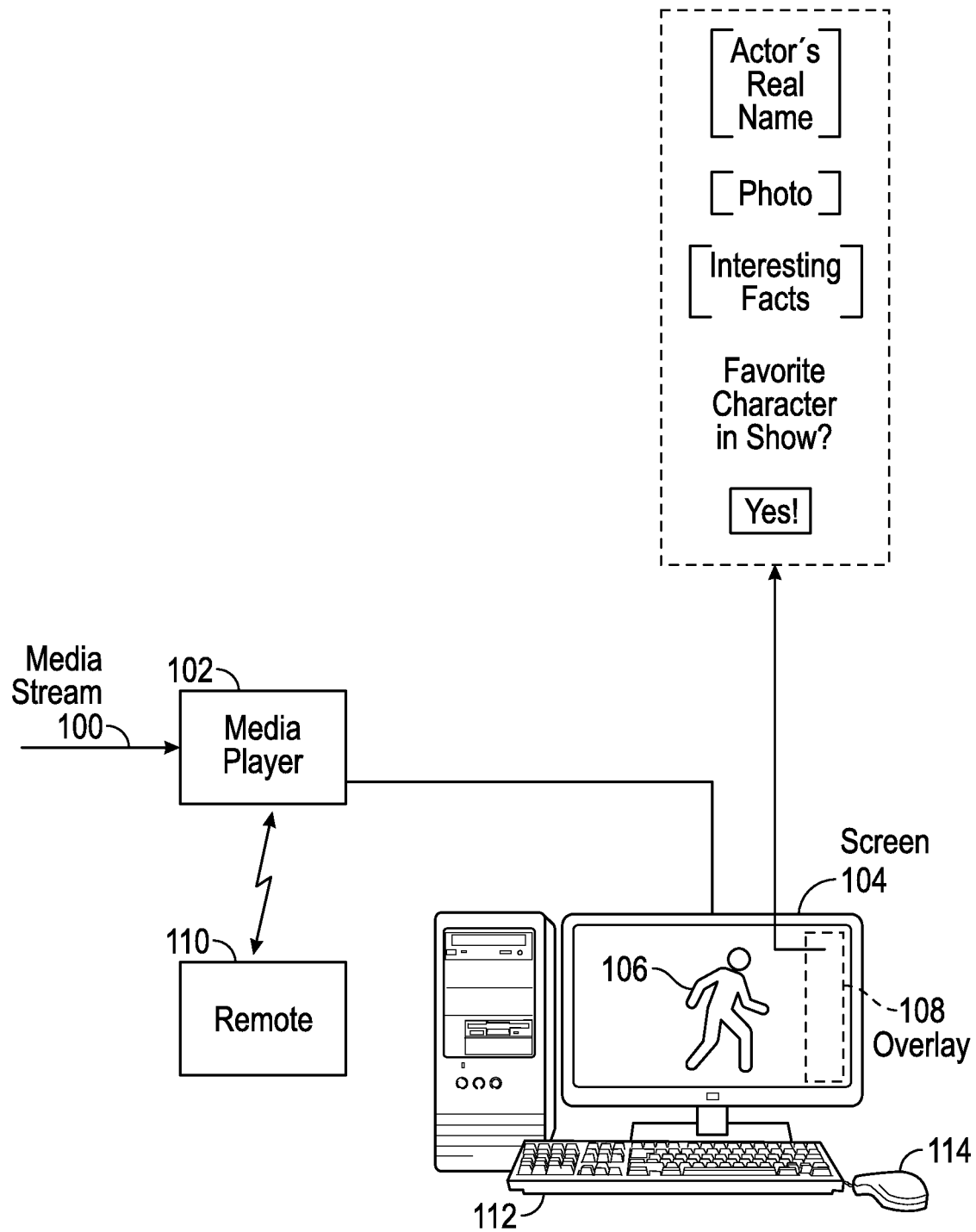
FIG. 1 illustrates an exemplary media stream viewing situation according to some embodiments of the disclosure.

FIG. 1 illustrates an exemplary viewing situation according to some embodiments of the disclosure. In the example of FIG. 1, a media stream 100 received by media player 102 is viewed on screen 104. The media stream 100 is digital data that optionally includes streaming video from online providers (e.g., Netflix, YouTube, Hulu, iTunes, HBO, etc.) or live TV (e.g., cable providers, satellite providers, applications such as MLB.com, NFL.com, NBA.com, NHL.com, etc.), and also optionally includes music, still images, games, and the like. In this example viewing situation, at some point during the program, a character 106 appears on the screen, defining the start of an event. During this event, an overlay 108 optionally appears on the right side of the screen, providing information that is optionally related to the event. In the example of FIG. 1, the overlay provides the actor's real name, a photo, and interesting facts.

Optionally, the overlay 108 is an interactive "voting overlay" that provides a voting menu or mechanism through which a vote can be cast by a viewer operating remote control 110 or other input device such as keyboard 112 or mouse 114. In the example of FIG. 1, the overlay provides a virtual button that allows a viewer to cast a vote for that character as their favorite character in the program. An overlay application associated with the displayed overlay optionally provides the viewer's vote to the creator of the program content or the distributor of the content, queries the content creator or distributor, and/or provides voting results in "real time" with respect to the location of the playhead within the program.

Although the example of FIG. 1 pertains to video programming, in other examples the digital content may contain music or other audio-only content (e.g., streaming music, concerts, lectures, audio books and the like). In those examples, the program content can also contain events that can trigger the presentation of additional content to enhance a user's listening experience, or the presentation of video content along with the audio content. Although examples of the disclosure may be primarily discussed in the context of digital video media for the purpose of brevity, it should be understood that the embodiments of the disclosure are not so limited, but are also applicable to digital audio media.

In the distribution of digital media, a content distributor can add advertisements into a media stream, while a content creator can encode timed metadata directly into the media stream, indicating that an event occurs at that point in the stream. However, the playhead of the media player is only aware of metadata that is available at the present location of the playhead in the media stream, and is unaware of any metadata (and events associated with the metadata) encoded in other parts of the media stream. In addition, because the duration of advertisements inserted into the media stream can vary from the expected duration, a stream timeline of the media stream can become inaccurate.

In the examples that follow, time-based events and other metadata in the media stream that establish their location in the media stream will be described, in addition to the storing of this metadata for use in synchronizing the events to the location of the playhead. In some examples, the events or other metadata are optionally given time attributes that establish their location in the media stream so that regardless of where the playhead is located within the media stream, the events that are active at that point in time can be identified and synchronized with the playhead. In some examples, a master clock can be used to update a stream timeline associated with the media stream to account for differences between the expected and actual duration of advertisements inserted into the media stream.

Figure 2:
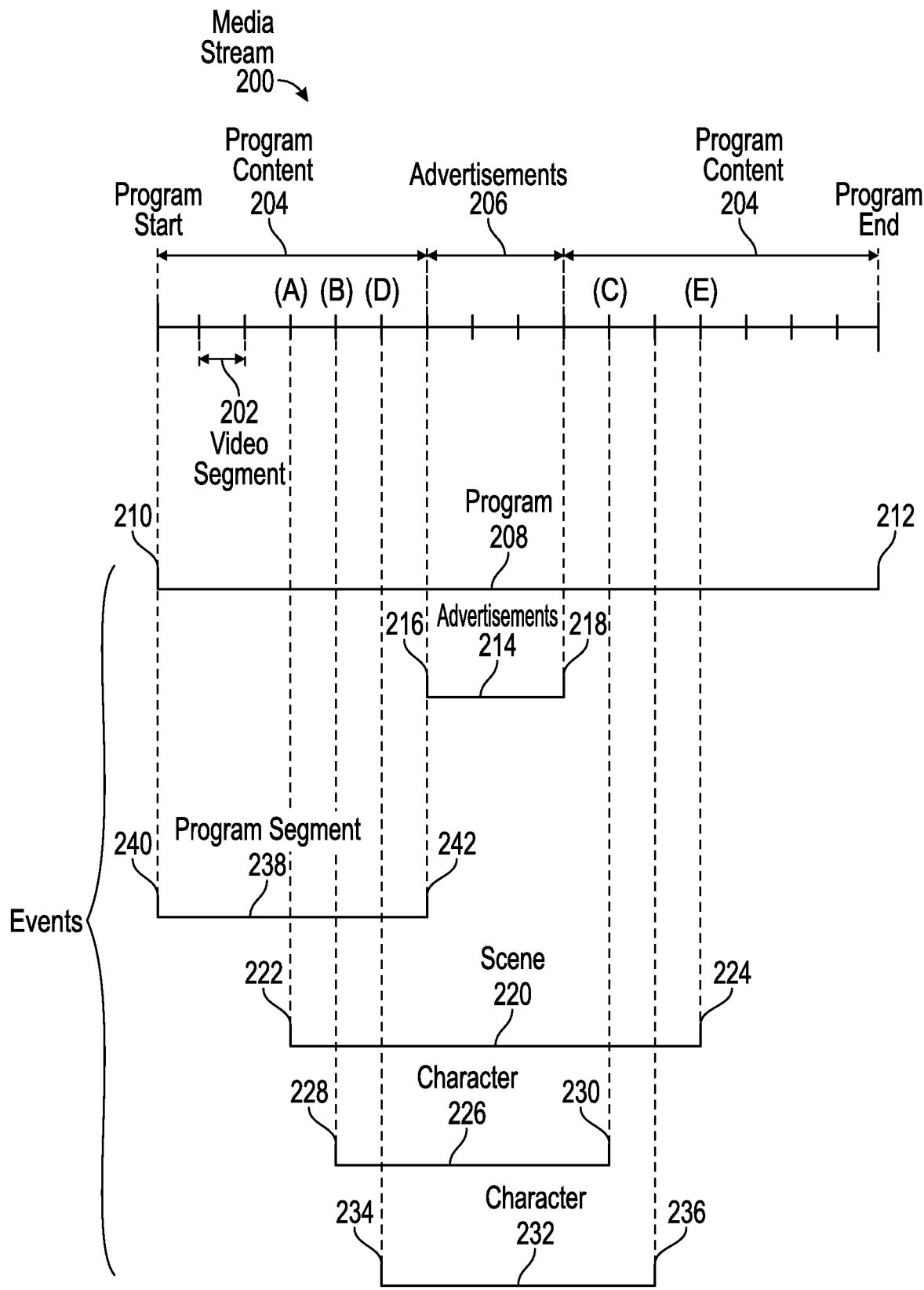
FIG. 2 illustrates an exemplary media stream according to examples of the disclosure.

FIG. 2 illustrates an exemplary media stream 200 according to examples of the disclosure. As illustrated in the example of FIG. 2, a media stream 200 that makes up a program to be viewed optionally contains a number of video segments 202 that need to be played back seamlessly, in the proper order, to provide the proper viewing experience. The media stream 200 optionally includes program content 204 and advertisements 206, and in some instances, closed caption data. The program content 204 and advertisements 206 are optionally formed from the video segments 202. Each video segment 202 optionally contains a pointer to the next video segment in the sequence.

Figure 3:
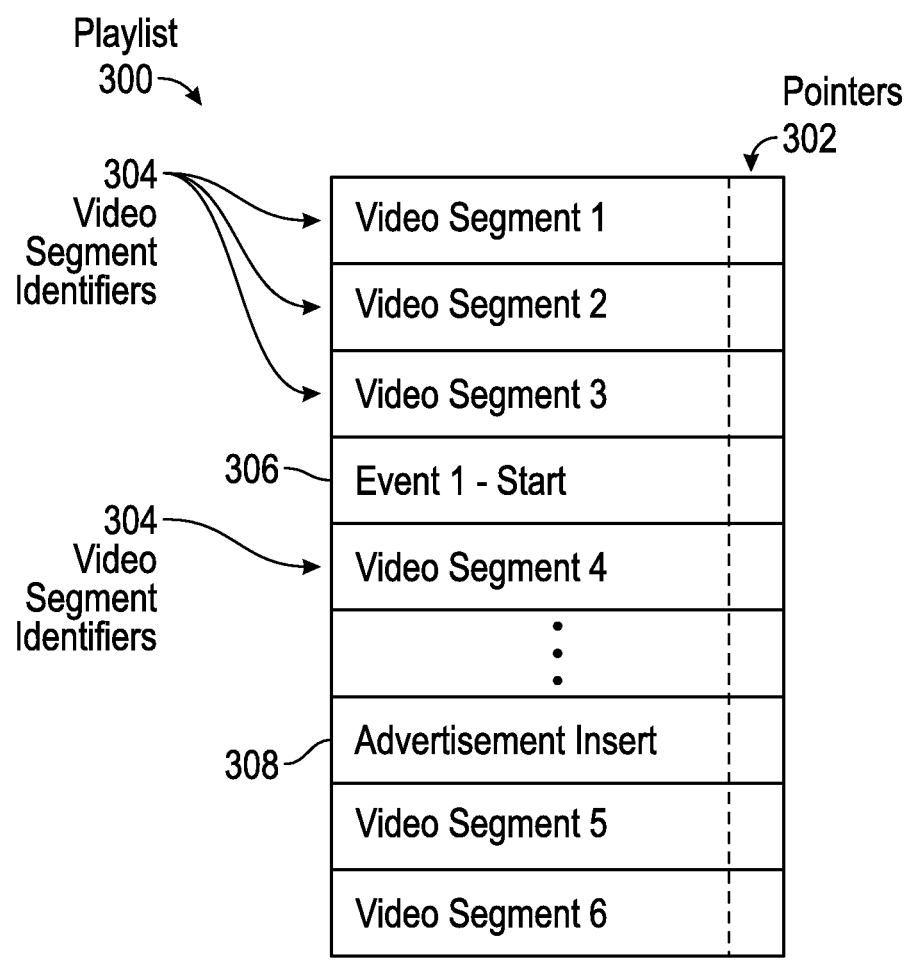
FIG. 3 illustrates an exemplary playlist according to examples of the disclosure.

FIG. 3 illustrates an exemplary playlist 300 according to examples of the disclosure. As illustrated in the example of FIG. 3, a playlist 300 is optionally a text file that optionally contains a list of video segment identifiers 304 including pointers 302 to the video segments that need to be retrieved and played. Each video segment identifier 304 is optionally further identified by a video segment number. In some examples, this playlist 300 is optionally separate from the media stream, and in some examples, this playlist is optionally embedded in the media stream. Using the pointers in the playlist 300, the actual video segments are optionally stitched together seamlessly so that even during transitions between video segments, the playback can appear seamless. The playlist is optionally also used to play, pause, rewind and fast-forward through the media stream.

Referring again to the example of FIG. 2, an event optionally represents the entire program 208 including the start and end of the entire program 210 and 212, the start and end of individual advertisements, a series of advertisements 214 including the start and end of the series of advertisements 216 and 218, a segment of a program uninterrupted by advertisements 238 including the start and end of the program segment 240 and 242, a particular scene 220 including the start and end of the scene 222 and 224, a character's appearance in one or more scenes 226 including that character's appearance and death 228 and 230, or another character 232 including that character's appearance and departure 234 and 236, to name just a few examples. In some examples, the same event optionally occurs multiple times within a single program.

Optionally, some events are characterized as major events that utilize resource-intensive overlays such as animations, videos and the like. For example, during the event 232 representative of a particular character's appearance and departure, an overlay is optionally displayed that continuously shows an animation that provides facts about that character.

In some examples of the disclosure, overlays optionally take on higher levels of abstraction. For example, a content creator can optionally insert a general event that is applicable for any of their content and simply identifies the content as being from that content creator. For example, if program 208 is content provided by Major League Baseball (MLB), that program can be associated with a general event that identifies the content as being provided by MLB. The overlay for that general event optionally provides information generally relevant to that content creator, such as programs from that content creator that will be shown in the future, for example.

A content creator can also optionally (and additionally) insert a more specific event that is applicable only to certain types of programming, all episodes of a particular TV series, or all games played by a certain professional sports team, to name just a few examples. Continuing the example from above, in addition to the general event identifying the content as being from MLB, a more specific event can be added that identifies the content as being associated with a particular MLB team. The overlay for that more specific event optionally provides information generally relevant to that particular team.

According to some examples of the disclosure, in order to allow downstream recipients to take advantage of the opportunities presented by events, metadata is optionally added to the playlist that identifies region-based events, defines the times at which these events occur (such as the beginning and end of these events, and/or the beginning and duration of these events), and optionally specifies other information relevant to the events. For example, metadata is optionally added to the playlist by a content creator to indicate that a particular event begins a certain time after the start of a particular video segment, and ends a certain time after the start of another video segment. In some examples, instead of defining the beginning time and ending time of a particular event, the above metadata optionally indicates the beginning time of the event—relative to the start of a particular video segment or program, for example—and a duration of the event (i.e., an offset). In some examples, the events are optionally inserted into the playlist between the video segment identifiers, though it is understood that the events optionally reside in an area of the playlist separate from the video segment identifiers. In some examples, the events are optionally added to the media stream itself as media stream metadata. In the example of FIG. 3, an event start time 306 has been added between video segment identifiers 3 and 4. Content distributors optionally further modify this playlist by adding metadata for inserted advertisements, including region-based events associated with those advertisements. In the example of FIG. 3, the content creator has included an advertisement insert 308 in the playlist before video segment identifier 5. A content distributor optionally adds the video segments for advertisements at this advertisement insert location in the playlist.

Figure 4:
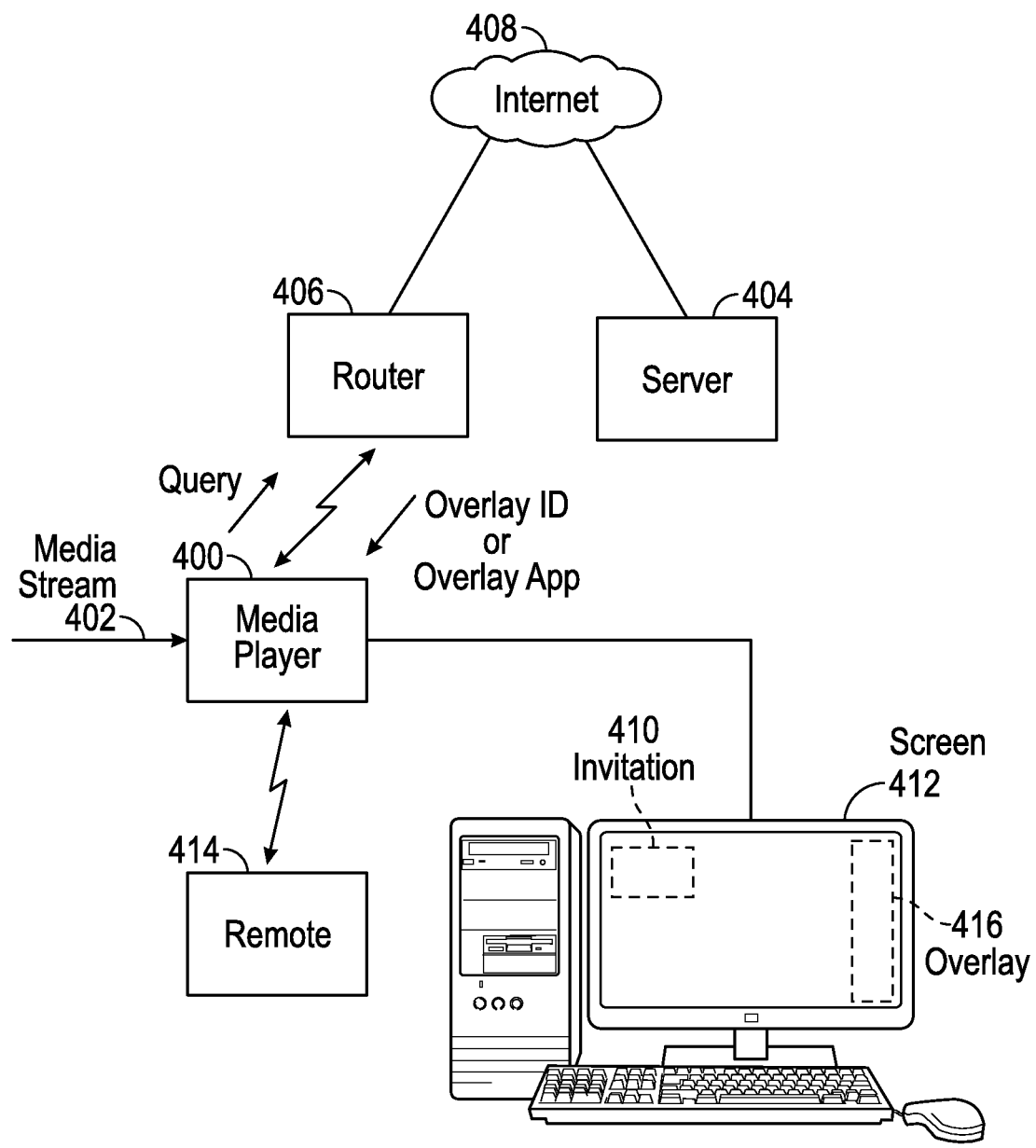
FIG. 4 illustrates an exemplary system environment according to examples of the disclosure.

FIG. 4 illustrates an exemplary system environment according to examples of the disclosure. In the example of FIG. 4, a media player 400 optionally receives a media stream 402 including the playlist and optionally stores the information from the playlist in a configuration file. The media stream 402 is optionally received from a network or the Internet 408, or from another source such as a satellite or cable feed. The information optionally includes particular events that are to occur, the timing of those events, and other metadata. The media player 400 optionally includes a metadata manager, which is a program that continuously monitors the media stream 402, looking for triggers or patterns in the media stream representative of playlists, events, advertisement inserts, and other metadata, and optionally extracts and saves this metadata into memory or storage. In some examples, after detecting a trigger before the start of an event, the metadata manager running in the media player 400 optionally queries a server 404 via a router 406 and the Internet 408, for example, to determine a bundle or overlay identifier (ID) associated with the event. Note that multiple events are optionally associated with the same overlay ID. The overlay ID uniquely identifies an overlay (and its overlay application) that is optionally displayed at some time during the event to present additional content to the viewer. It should be understood that the overlay is the actual content to be displayed, while the overlay application is the code or software that controls, defines and/or generates the appearance of the overlay. On the other hand, if the content distributor is not allowing overlays, the process of retrieving overlay IDs from the remote server 404 is optionally used to prevent the identification of the overlay ID, by not making the overlay ID retrievable. In other examples, the event is optionally correlated to an overlay ID stored in local storage or memory within the media player 400, without querying the remote server 404.

After the overlay ID is known, the media player 400 optionally makes a determination as to whether the overlay application for the identified overlay has been downloaded. If not, the media player 400 optionally triggers the downloading of the overlay application via the router 406. Because the overlay ID and the actual overlay application associated with the event or other trigger are obtained from the remote server 404 in some examples of the disclosure, this process optionally enables new revisions of the overlay application to be specified at the server and obtained as soon as they are available, or an entirely new overlay application is optionally associated with the event or trigger, downloaded and invoked.

Because many events are optionally present in the playlist, and the overlays associated with those events can be resource-intensive, in some examples of the disclosure the media player 400 optionally looks ahead and downloads, caches and/or warms up one or more overlay applications so that they are optionally ready to be launched when needed. "Warming up" an application optionally includes performing some of the steps of launching the application (i.e., pre-launching the application), such as loading data associated with the application into memory, fetching some of the data from memory, executing some of the instructions associated with the application, and the like. In general, warming up an application optionally encompasses any subset of the operations needed to fully launch an application, just short of fully launching it. For example, as the playhead progresses forward in time and transitions across video segments and events (which do not have to line up with the start of the video segments), the metadata manager running in the media player 400 optionally reads the metadata, determines an upcoming event, and uses the start of the event to download and warm up assets in advance of the moment within the event at which the overlay will be presented to the viewer.

As mentioned above, when a content creator creates video content and events for a program, the content creator can insert markers (advertisement inserts) of zero duration into the video stream to indicate where the advertisements are supposed to appear. The actual duration of the advertisements may be unknown to the content creator at that time. Because the actual advertisements are optionally added by content distributors downstream from the content creator, it can be a challenge to preserve the timing of events created by the content creator in view of modifications made by downstream entities such that the timing of the events remains accurate at the time of broadcast. In particular, the timing of the events optionally need to be adjusted after the insertion of the advertisements to account for the time added by these advertisements.

As mentioned above, content creators optionally add metadata to the playlist. The metadata optionally identifies an event, and optionally defines the time at which these events occur. In some examples, the events are optionally inserted into the playlist between the video segments, and the timing of the events is optionally identified by specifying the video segment in which they appear, in addition to a time offset from the start of the video segment. For example, if a program is divided into first and second halves separated by an advertisement insert, an event is optionally specified to start with an offset of X seconds from the start of video segment A within the first half of the program, and end with an offset of Y seconds from the start of video segment B within the second half of the program. The event, along with the timing of the event, is optionally saved into a configuration file in the media player so that regardless of where the playhead is located, active events for that moment in time can be determined. In other words, the time attributes establish the location of the events in the media stream so that regardless of where the playhead is located within the media stream, the events that are active at that point in time can be identified and synchronized with the playhead. In addition, because the timing of the event is specified in terms of an offset from a video segment, and not from a fixed point such as the start of the program, the subsequent insertion of advertisements does not change the relationship of the event timing and the video segments or the relative location of the events in the media stream, and the event timing does not need to be updated.

In other examples, event timing is optionally specified using event start and end times that are defined in terms of offsets from the beginning of a program. In yet other examples, event timing is optionally specified using event start times—defined in terms of offsets from the beginning of a program or video segment—and event durations. When event timing is specified in the above manners, the insertion of advertisements can cause these offsets and/or durations to become inaccurate. Accordingly, the metadata manager optionally retrieves and analyzes the advertisement event and metadata stored from the playlist to determine the time delays added by the advertisements, and the offset and/or duration times of the events are optionally modified to take into account the time delays of the inserted advertisements.

Figure 5A:
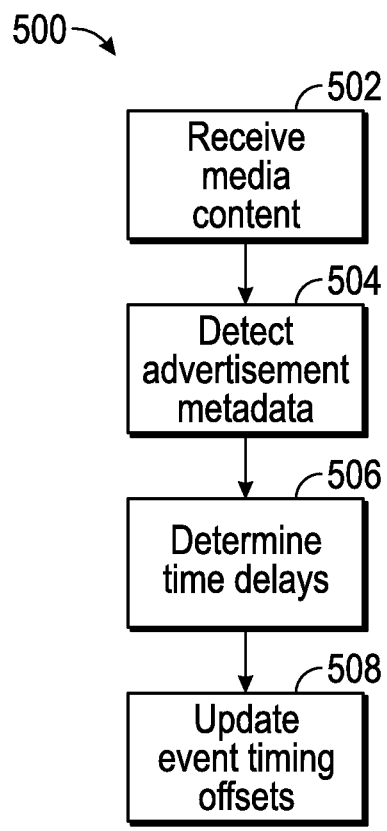
FIG. 5a illustrates an exemplary algorithm for modifying the timing of certain events according to some examples of the disclosure.

FIG. 5a illustrates an exemplary algorithm 500 for modifying the timing of certain events according to some examples of the disclosure. The exemplary algorithm 500 is optionally applicable when event start and end times are specified in terms of an offset from the beginning of a program, or when event timing is specified using event start times and event durations. In the example of FIG. 5a, media content is optionally received at 502. Advertisement metadata is optionally detected within the media stream at 504. At 506, time delays caused by the advertisement are optionally determined from the advertisement metadata. The offsets and/or durations in the event timing information are optionally updated to account for the time delays at 508.

Digital media streams, and in particular video on demand, allow a viewer to selectively move around within the media stream to a location specified by the playhead of the media player, subject to certain rules. In some examples, if the viewer wants to skip to a particular video segment, the playhead is optionally allowed to jump to that video segment, but in other examples, the viewer is optionally contractually bound to watch an advertisement before jumping to the desired video segment.

In general, if a viewer skips to a particular time in the media stream, the metadata manager optionally issues a query to the configuration file so that all events that are active at that moment in time are identified, and any downloading, installing, and warm-up tasks that need to be performed in accordance with that event commence at that time. Again, because the time attributes of an event establish its location in the media stream relative to other video segments, at any moment along the video stream, active events are optionally identified. For example, if the start and end of an event is defined by when a character appears in, and later departs from, a scene, and the viewer skips to a moment in time when the character is already appearing in the scene, the software is optionally made aware of the active event (even though the event started some time ago) and optionally takes appropriate action to download the overlay application associated with that event.

However, in some instances there may be insufficient time to download the overlay application. Referring back to the example of FIG. 5, an event 520 may contain metadata indicating that the event starts and ends at times (A) and (E), the actual overlay is needed at time (D), and download/warm-up of the overlay application should begin at time (B). However, if the viewer relocates the playhead to time (C), the metadata manager may not have sufficient time to download and warm up the overlay application and have it ready at time (D). "Warming up" an application optionally includes performing some of the steps of launching the application (i.e., pre-launching the application), such as loading data associated with the application into memory, executing some of the instructions associated with the application, and the like. One way to compensate for a lack of download/warm-up time is by altering the presentation of the content. For example, if the overlay is supposed to be faded in, the fade-in is optionally skipped, and the overlay is optionally presented the moment it is ready. Alternatively, if there is simply no time to download the overlay application, for example near the end of the event, the presentation of the overlay is optionally skipped.

To provide adequate time for downloading and other preparatory tasks, in some examples of the disclosure, special events are optionally embedded in advance of a major event (an event that utilizes resource-intensive overlays such as animations and the like). The purpose of a special event is optionally to enable the media player 400 to get ready for the major event by performing downloads and warm-ups in advance of the major event. If a viewer skips directly to the major event, the media player 400 optionally recognizes that the special event is still ongoing and applicable, and the media player optionally tries to catch up with downloading tasks and downloads other overlays that will be needed later in the major event.

Figure 5B:
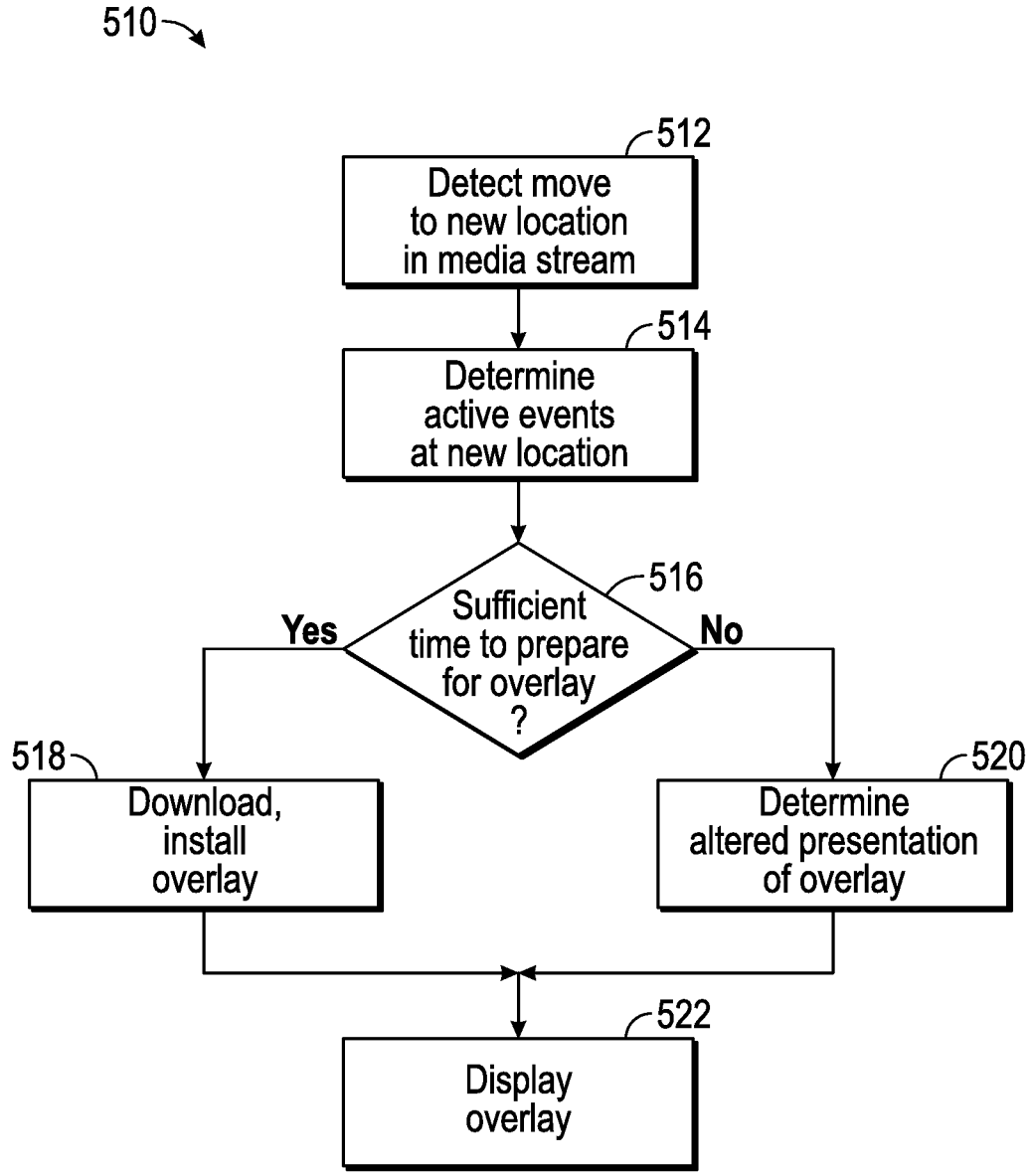
FIG. 5b illustrates an exemplary algorithm for synchronizing events to the playhead according to some examples of the disclosure.

FIG. 5b illustrates an exemplary algorithm 510 for synchronizing events to the playhead according to some examples of the disclosure. In the example of FIG. 5b, movement to a new location in the media stream is optionally detected at 512. At 514, the events that are active at that location in the media stream are optionally determined. A determination as to whether there is sufficient time to prepare for the overlay is optionally made at 516. If there is sufficient time, then the overlay ID and overlay application are optionally retrieved, downloaded, installed, and warmed up as necessary at 518. On the other hand, if there is insufficient time, further algorithms are optionally executed to determine an altered presentation of the overlay content at 520. At 522, the overlay is optionally displayed in either its complete or altered form.

Live programming can present challenges with respect to the synchronization and updating of event information. The playlist and metadata embedded into the media stream are optionally dynamically edited by content creators during live programs. In a live baseball game, for example, as various events in the game occur, the content creator optionally writes new metadata into the playlist. For example, a baseball game optionally has multiple overlapping events, such as one event for each inning, one event for each out in an inning, and events for the most interesting plays in an inning, which optionally change as the inning progresses. Through the overlay associated with the most interesting plays, the user can request to see the most interesting play in the inning, and the overlay optionally shows just the most recent most interesting play by moving the playhead back to that moment in time.

In another example, should a live baseball game take longer than expected, the end time of events that are supposed to last the entirety of the game are optionally extended and updated in the playlist. In yet another example, Major League Baseball (MLB) may insert an event into its broadcast about related games, and an associated overlay optionally retrieves the outcomes of these related games from a remote server, and displays both the outcomes and how the outcomes affect the present game.

To accommodate changing events during live programs, the metadata manager according to some examples of the disclosure optionally re-reads the playlist (including any new or updated events) at predetermined intervals such as every 2-10 seconds depending on the implementation of the playlist.

Re-broadcasts of previous live programming can also present challenges with respect to the synchronization and updating of event information. In some examples, when a program is broadcast live but is stored and viewed on a delayed basis, the overlays in the program are optionally configured to present related content as though the program was being viewed live. For example, even though the outcome of a related game may have been known days ago, the overlays optionally present the outcome of that related game at the precise moment during the program at which the outcome would have first been known. In another example, a voting overlay appearing during a re-broadcast optionally queries the content distributor or creator and provides voting results in pseudo-real time with respect to the location of the playhead within the program. In other words, the voting results are optionally provided to the viewer, but correlated to the playhead so that results won't be provided prematurely, or before they are meaningful. Conversely, in some examples of the disclosure, outcomes known only after the live broadcast are optionally made available during the re-broadcast by adding events and other metadata into the playlist after the live broadcast, for use during a re-broadcast.

In some examples of the disclosure, at the discretion of the content provider, the overlay associated with the program is optionally designed to give the viewer the choice of viewing a re-broadcast with only the metadata available at the time of the live showing, or with metadata added after the live showing. In another example, the metadata is optionally configurable to emphasize or prioritize some information over other information, such as the statistics of one team or another.

The re-broadcast of previously live programs that provide for viewer voting can also create synchronization challenges, because making previous voting results known too early in a re-broadcast can ruin a viewer's experience. Accordingly, in some examples of the disclosure, the overlay optionally queries the content distributor or creator to provide voting results correlated to the location of the playhead within the program. In other words, in the case of re-broadcasts, voting results are optionally provided to the viewer that correspond to the results available at the time specified by the playhead when the program was being broadcast live.

Figure 6:
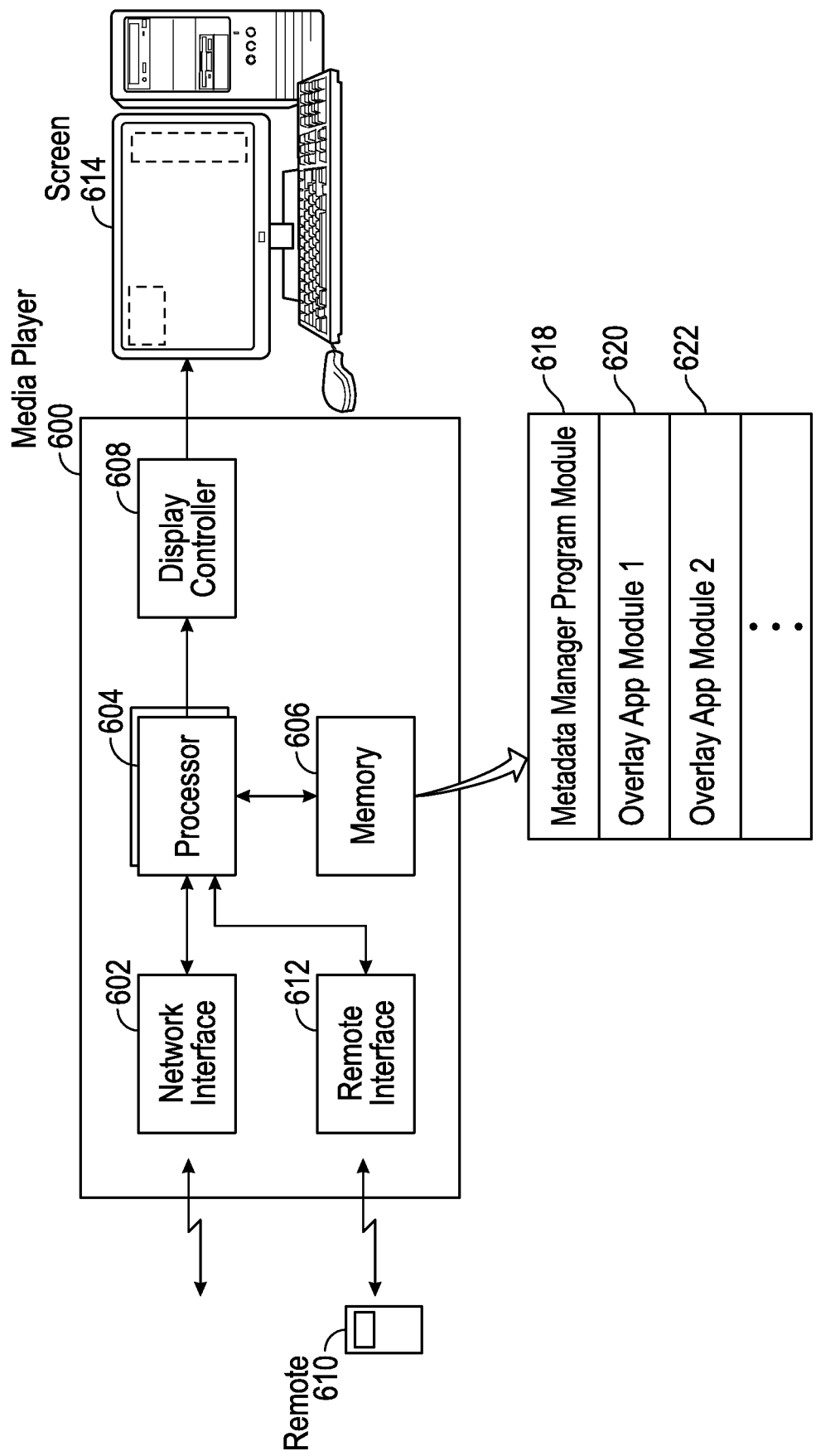
FIG. 6 illustrates a block diagram of an exemplary architecture for the media player according to some examples of the disclosure.

FIG. 6 illustrates a block diagram of an exemplary architecture for the media player 600 according to some examples of the disclosure. In the example of FIG. 6, media content can be received into the media player via a network interface 602, which is optionally a wireless or wired connection. The content is optionally evaluated by a metadata manager 618, and information in the media content such as playlists, events, and other metadata and triggers are optionally detected and stored in a file. The metadata manager 618 optionally retrieves an overlay ID associated with the trigger from a remote server via the network interface 602. The metadata manager 618 optionally also determines if the specific overlay application associated with the retrieved overlay ID is available, and downloads the application from the remote server if necessary (see overlay application modules 620 and 622 in the example of FIG. 6). The metadata manager optionally also determines when a specific overlay will be needed, and optionally directs the one or more processors 604 to install and warm-up the application associated with that specific overlay. The one or more processors 604 optionally execute the metadata manager and a number of specific overlay applications stored in memory 606 or storage.

In some examples, at the appropriate time as determined by the metadata manager, the specific overlay application optionally causes display controller 608 to insert the overlay into the video stream and display an overlay invitation glyph (or update the content of an already-displayed overlay in the video stream), and a viewer can respond to the invitation using a remote control 610 or other input device that communicates with the media player via interface 612, which is optionally a wireless or wired connection. In other examples, viewer history stored in memory 606 is optionally used to determine whether an overlay should be displayed. If the metadata manager or the specific overlay application determines that the overlay is to be displayed, it optionally utilizes the display controller 608 to insert and display the overlay over the program content on screen 614. If the displayed overlay is interactive, a viewer can provide input using the remote control 610.

The modification of the timing of certain events as illustrated in FIG. 5a, the synchronizing of events to the playhead as illustrated in FIG. 5b and described above, the presentation of content synchronized to the location of the playhead, and the presentation of content synchronized to the re-broadcasting of live programs as described above can be performed by the media player components of FIG. 6 in conjunction with the system components of FIG. 4.

Although examples of the disclosure discussed above are directed to time-based events and/or other metadata that are provided with a media stream and are given time attributes that establish their location in the media stream, in some examples discussed below, event metadata and/or other data is optionally received out-of-band with respect to the media stream. As will be described below, the out-of-band event metadata or other data is optionally correlated with the media stream and subsequently utilized to display information or perform operations.

Figure 7:
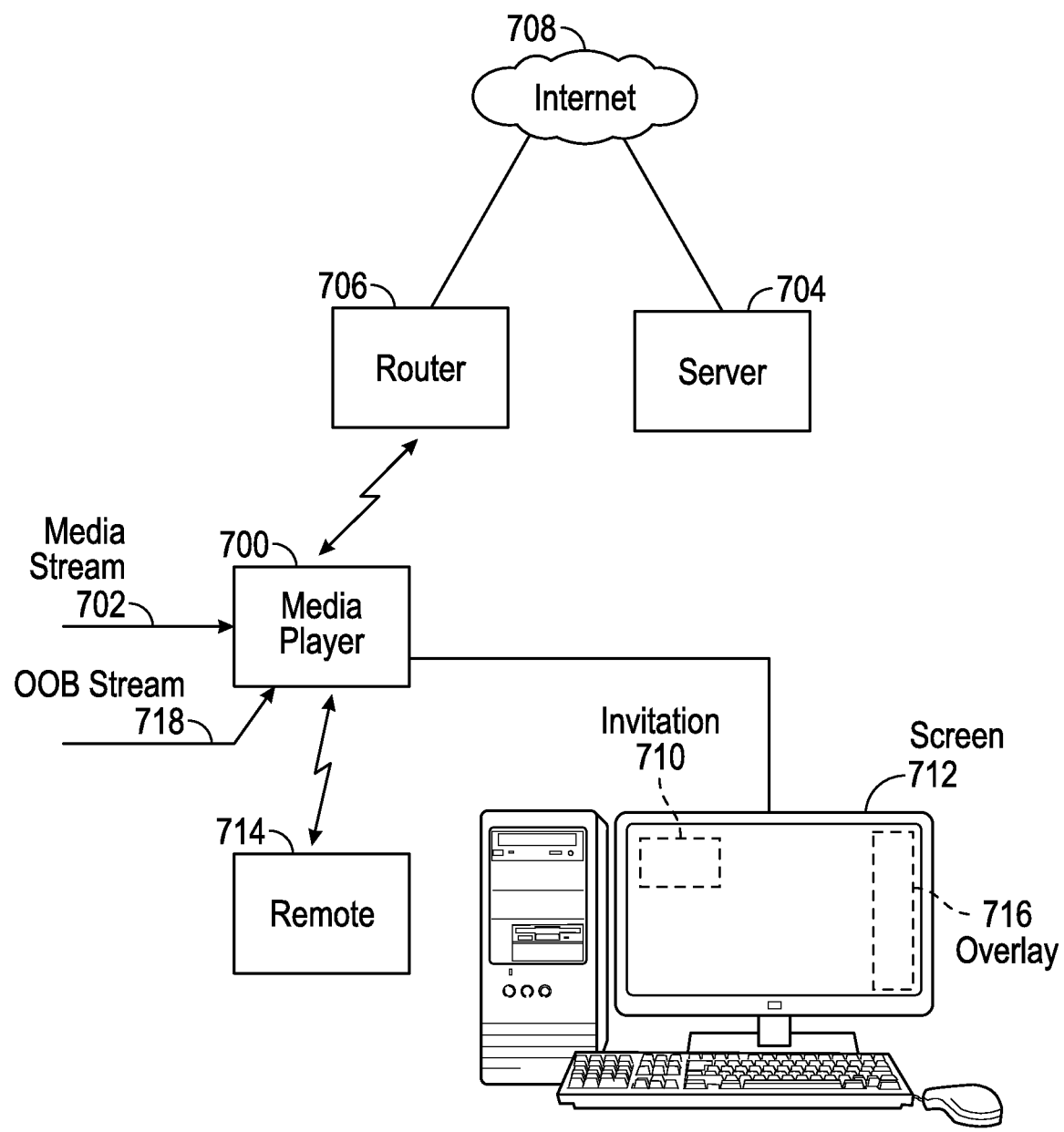
FIG. 7 illustrates an exemplary system environment according to examples of the disclosure.

FIG. 7 illustrates an exemplary system environment according to examples of the disclosure. In some examples shown in FIG. 7, in addition to a media stream 702 that is optionally received from a network, Internet 708 or other location such as a satellite or cable feed, a separate out-of-band (OOB) stream 718 is optionally received. In some examples, the OOB stream 718 is optionally received by the media player 700 in response to a request by the media player to receive the OOB stream (e.g., in response to the media player receiving a media stream 702 that does not contain event metadata, and that optionally specifies that the media player should request the corresponding OOB stream separately). In some examples, the source of the OOB stream 718 is optionally the creator of the media stream 702, the content distributor, or the provider of the media presentation system.

In some examples of the disclosure, the OOB stream 718 optionally contains only event metadata, but in some examples the OOB stream optionally includes event data along with a different media stream. Upon receiving the OOB stream 718, the media player 700 optionally matches the OOB stream with the media stream 702 being received for viewing, using a media ID of the media stream that is optionally retrieved from a server such as server 704. Upon an optional determination that the OOB stream 718 is associated with the media stream 702, the media player 700 optionally extracts OOB event metadata from the OOB stream and stores this OOB event metadata. The media player 700 optionally correlates the OOB event metadata with the media stream 702 using timestamp information present in both the OOB event metadata and the media stream in order to properly sequence the OOB event metadata with the media stream, as will be described in further detail below. The correlated OOB event metadata is optionally stored separate from the media stream 702, or is optionally embedded within the media stream.

As the media stream plays, and the timestamp of the playhead matches a timestamp of the correlated OOB event metadata, an event processor in the media player 702 optionally performs one or more tasks depending on the nature of the OOB event metadata. In some examples of the disclosure, the media player 702 optionally queries a server 704 for data, or optionally locates data stored locally. When the data is available, the media player optionally performs one or more operations such as displaying information or an overlay, downloading overlay applications or other information, or running certain applications in accordance with the data.

Figure 8:
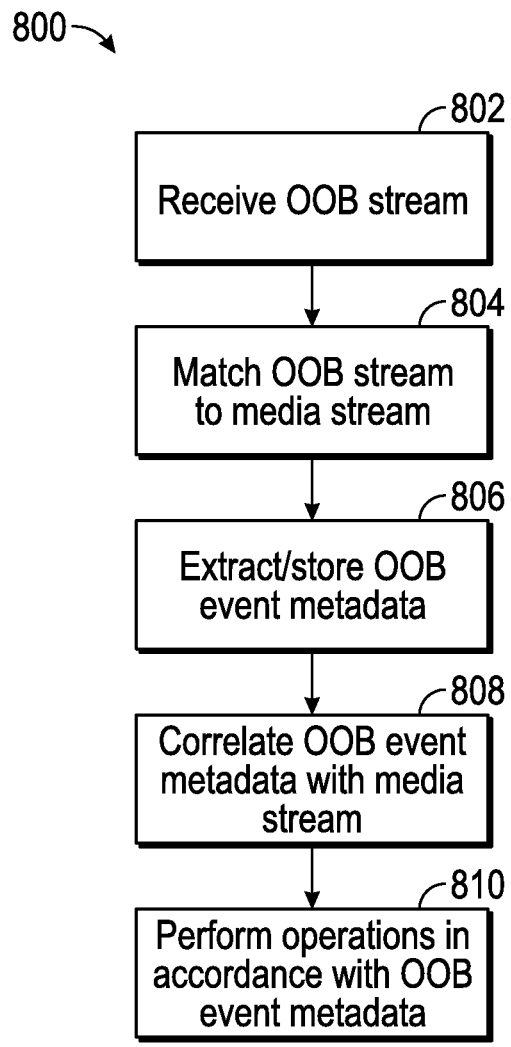
FIG. 8 illustrates an exemplary algorithm for processing an OOB stream according to some examples of the disclosure.

FIG. 8 illustrates an exemplary algorithm 800 for processing an OOB stream according to some examples of the disclosure. In the example of FIG. 8, an OOB stream is received at 802. The OOB stream is optionally matched to a media stream at 804. OOB event metadata is optionally extracted from the OOB stream and stored at 806. The OOB event metadata is optionally correlated to the media stream at 808. Operations are optionally performed in accordance with the OOB event metadata at 810.

Figure 9:
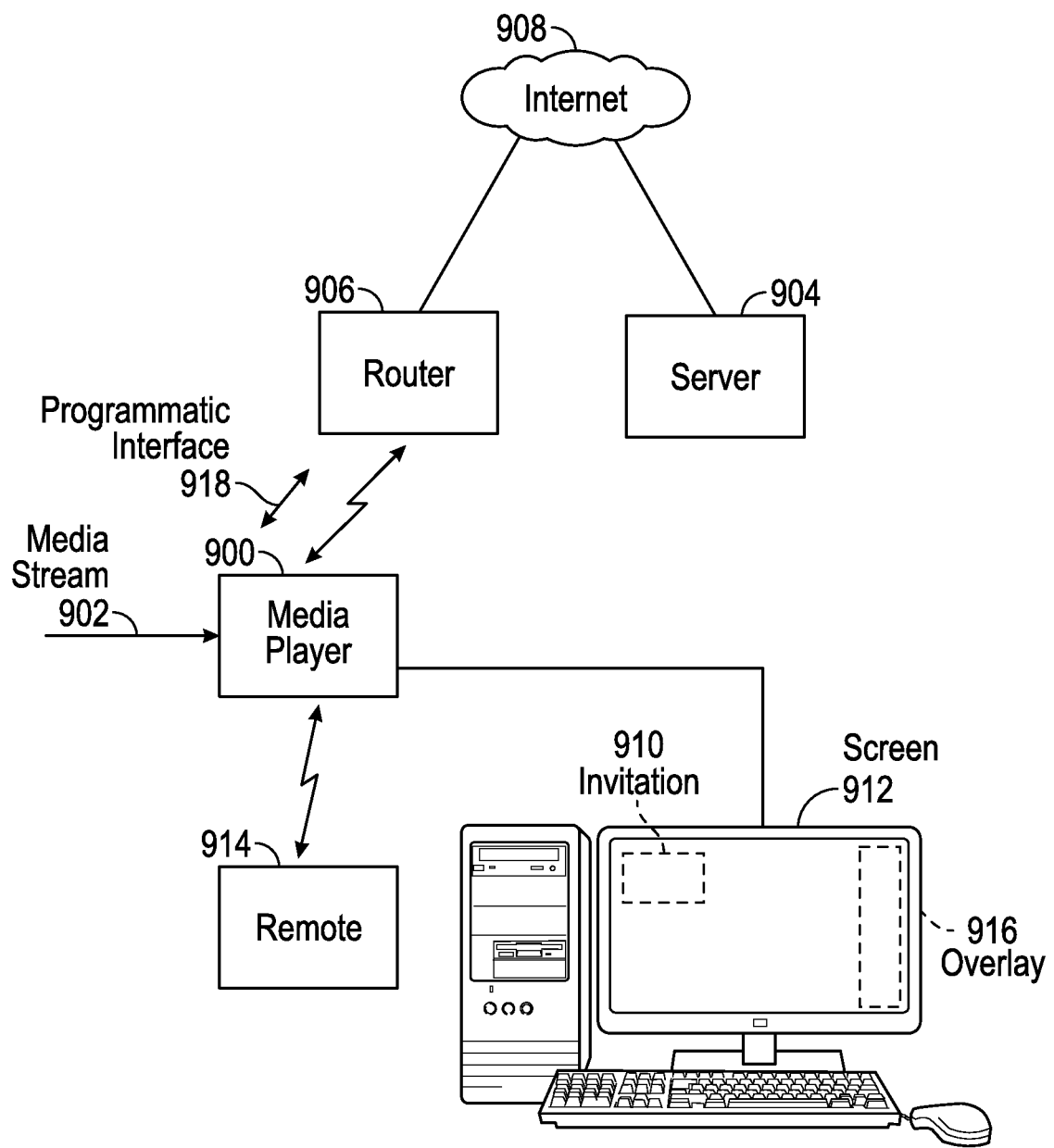
FIG. 9 illustrates an exemplary system environment according to examples of the disclosure.

FIG. 9 illustrates an exemplary system environment according to some examples of the disclosure. In some examples shown in FIG. 9, in addition to a media stream 902 that is optionally received from a network, Internet 908 or other location such as a satellite or cable feed, a separate out-of-band (OOB) communications pathway 918 is optionally established. In some examples, the OOB communications pathway 918 is optionally established between the creator of the media stream 902 or the content distributor (at server 904, for example) and the provider of the media presentation system.

In some examples of the disclosure, a request is optionally received over the OOB communications pathway 918 from the content creator or distributor, for example. The request optionally specifies that notifications be transmitted to the content creator or distributor when a specific location (e.g. timestamp) in the media stream has been reached by the playhead during playing of the media stream. These media stream timestamps are optionally provided as specific show timelines, offsets, and the like. Upon receiving the media stream timestamps, the media player 900 optionally stores these timestamps, and attempts to match these timestamps to a playback (master) clock indicative of the location of the playhead. When the specified timestamp is reached, the media player 900 sends a notification out over the OOB communications pathway 918 to the content creator or distributor.

In response, the content creator or distributor optionally queries a metadata engine, and extracts and returns data associated with the relevant timestamp over the communications pathway 918 to the media player 900 via an application programming interface (API) in the media player. In some examples, the data is optionally display data that is then optionally used by the media player 900 to display something along with the program being displayed, or optionally instead of the program being displayed (e.g., data for display in an overlay). In some examples, the data is formatted as OOB event data, which is optionally used by an event processor in the media player 900 as described above. Such a system is essentially a real time conversion mechanism or metadata pump that is received through a programmatic interface.

Figure 10:
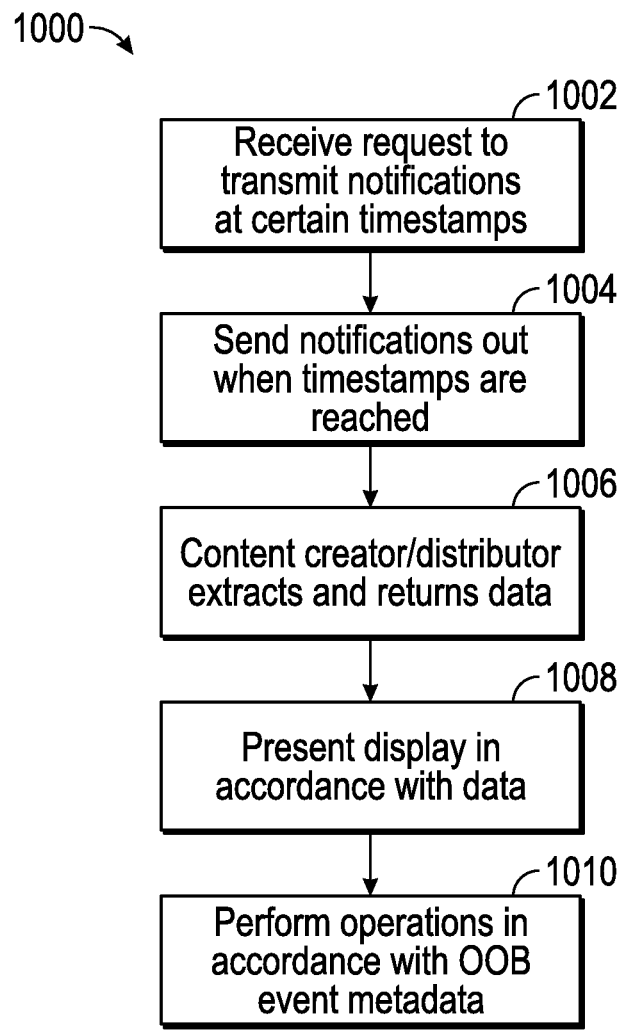
FIG. 10 illustrates an exemplary algorithm for providing a metadata pump according to some examples of the disclosure.

FIG. 10 illustrates an exemplary algorithm 1000 for providing a metadata pump according to some examples of the disclosure. In the example of FIG. 10, a request to receive notifications at certain media stream timestamps is received at 1002. Optionally, these notifications are requested during live broadcasts, re-broadcasts, or at any time during the playing of the media stream. Notifications are sent out when the timestamps are reached at 1004. The content creator or distributor extracts and returns data at 1006. Information is optionally displayed in accordance with the data at 1008, or alternatively/additionally, if the data is OOB event metadata, operations are optionally performed in accordance with the OOB event metadata at 1010.

As mentioned above, OOB event metadata optionally needs to be correlated to the timing of the media stream. To perform this correlation, OOB event metadata optionally includes timestamps. Because a media stream also contains timestamps, the timestamps of both the OOB event metadata and the media stream are optionally used to correlate the OOB event metadata with the media stream so that the OOB event metadata is sequenced properly with the media stream. In some examples, timestamps are optionally relative in nature, defining an offset from some starting point, or alternatively absolute in nature, defining a particular date/time created, for example. The timestamps of the OOB event metadata and the media stream are optionally converted, as necessary, to the same type of timestamp for correlation purposes.

Figure 11:
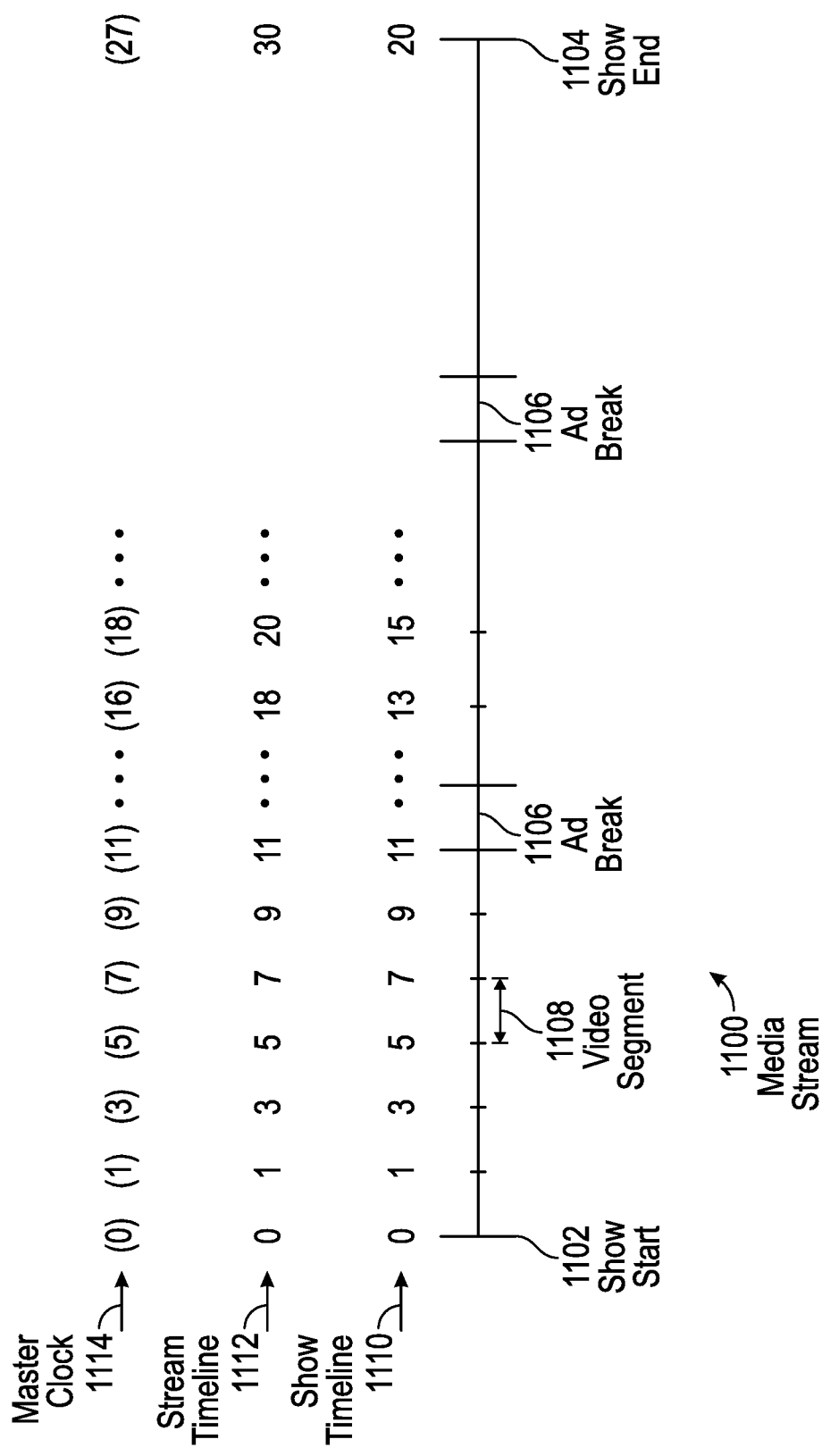
FIG. 11 illustrates an exemplary timeline of a media stream according to some examples of the disclosure.

FIG. 11 illustrates an exemplary timeline of a media stream according to some examples of the disclosure. In the example of FIG. 11, a media stream 1100 includes a program start 1102 and a program end 1104, advertisement breaks 1106, and video segments 1108. Several different types of timestamps are optionally associated with a media stream. Show timeline 1110, whose timestamps are represented symbolically in FIG. 11 as units 1-20, is relative in nature. The timestamps are optionally defined as an offset from the start of the program, for example. Show timeline timestamps are associated with specific moments (content) in the program, and do not change even when the program is lengthened due to the insertion of advertisements into the media stream. This allows the show timeline to be preserved through various production-to-delivery mechanisms, which may be necessary to preserve the continuity of event processing. Stream timeline 1112, whose timestamps are represented symbolically in FIG. 11 as units 1-30, is optionally relative in nature (an offset from the start of a program) or absolute (a given time value). Stream timeline timestamps represent elapsed time (also referred to herein as wall time), such as 30 units of time from the start of the program. In other words, wall time is not the present time (as shown on a clock, for example), but rather, a relative concept. Thus, for example, the last video segment (containing a surprise ending) in a program without advertisements can have a show timeline timestamp of 20 and a stream timeline timestamp of 20, indicating that the surprise ending occurs 20 units into the program (as defined by the content); but with the insertion of advertisements, the surprise ending will still have a show timeline timestamp of 20 but a stream timeline timestamp of 30, indicating that 30 units of time have elapsed since the start of the program—the extra 10 units of time reflecting the time of the inserted advertisements.

As mentioned above, to properly correlate OOB event metadata, the timestamps of the OOB event metadata and the media stream should optionally have the same type of timestamp, and in some examples of the disclosure, conversions are optionally necessary. For example, relative show timeline timestamps for the start of a program (0 program start+0 offset) and the end of the program (0 program start+20 offset) can be converted to absolute show timeline timestamps of 8 pm EST and 8:20 pm EST, respectively. Conversions from absolute to relative show timestamps can also optionally be performed. However, whether they are relative or absolute, as mentioned above, the use of show timeline timestamps (as opposed to stream timeline timestamps) allows for the preservation of the continuity of event processing.

As mentioned above, the insertion of advertisements into the media stream does not affect the show timeline timestamps, but does affect the stream timeline timestamps. Continuing the example from above, if advertisements added precisely 10 units of time to a program, the calculation of stream timeline timestamps would be accurate. However, it is possible that advertisements expected to take 10 minutes actually take only 7 minutes, for example. Without knowing the actual duration of the advertisements, the stream timeline can be computed incorrectly.

To correct for this, some examples of the disclosure optionally make use of a master clock. The master clock is optionally maintained by an entity other than the content creator or distributor and is received at the media player. The master clock is a representation of the actual elapsed time of a program. In contrast, the stream timeline is a representation of the calculated elapsed time. Thus, continuing the examples above, and as shown in the example of FIG. 11, a master clock 1114 may show values representative of 27 units of time from the start to the end of the program, whereas the stream timeline reflects a program duration of 30 units. The difference is that the stream timeline was calculated based on an expected advertisement delay of 10 units, while the master clock reflects an actual advertisement delay of only 7 units.

The actual advertisement duration is optionally available via a "run-as" log or other mechanism that computes the difference between the master clock and the stream timeline. The difference is optionally used to update the stream timeline. Because of the inherent delays in the delivery of the actual program to a viewer, the correction of the stream timeline is optionally performed in advance of the displaying of the program content. The use of the corrected stream timeline and master clock optionally enables the accurate use of playback controls such as FF and rewind, and the presentation of accurate time-related information on the media player. In other examples, corrected stream timelines are optionally used to fulfill contractual obligations. For example, if a viewer fast-forwards over an advertisement break and then presses the play button, due to contractual reasons the viewer may have to view at least the last advertisement, or part of that advertisement. In that situation, it is necessary to know where the advertisement break is, and how long it is, so that the media player can go back and play part or all of the advertisement break, and then move the playhead back to the spot that the viewer wanted to watch.

Figure 12:
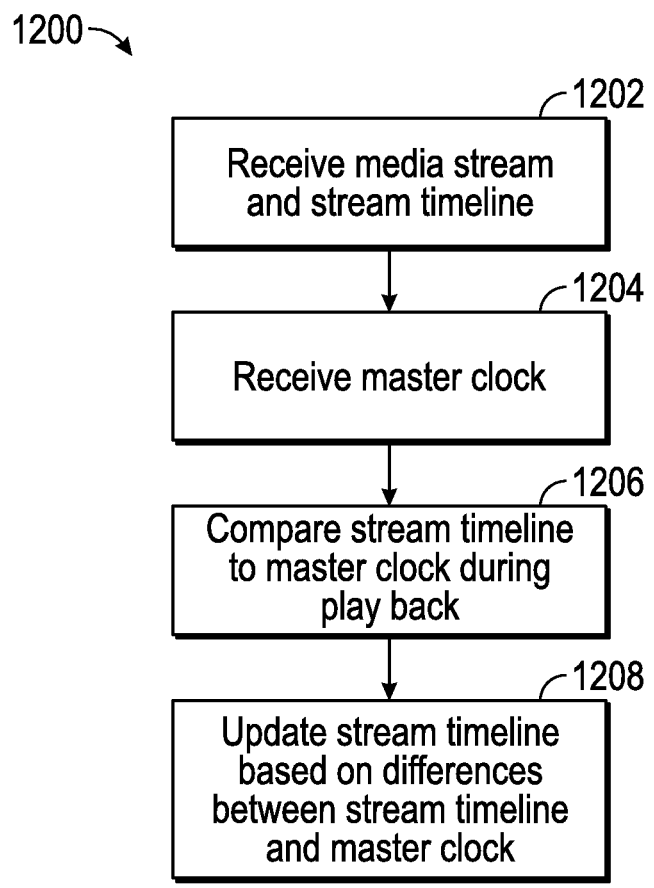
FIG. 12 illustrates an exemplary algorithm for correcting a stream timeline in a media stream according to some examples of the disclosure.

FIG. 12 illustrates an exemplary algorithm 1200 for correcting a stream timeline in a media stream according to some examples of the disclosure. In the example of FIG. 12, a media stream along with a stream timeline is received at 1202. A master clock is received at 1204. During the playback of the media stream, the stream timeline is compared to the master clock at 1206. Differences between the stream timeline and the master clock are used to update the stream timeline at 1208.

Examples of electronic devices, user interfaces for such devices, and associated processes for using such devices that are compatible with examples of the disclosure will now be described. In some examples, the device is optionally a media player, but in other examples, the device is optionally a portable multifunction communications device that optionally also contains other functions, such as PDA and/or music player functions. Exemplary multifunction devices optionally include, without limitation, the iPhone®, iPod Touch®, iPad® and Apple TV® devices from Apple Inc. of Cupertino, Calif. Other portable electronic devices, such as laptops or tablet computers with touch-sensitive surfaces (e.g., touch screen displays and/or touch pads), are optionally used. It should also be understood that, in some examples, the device is optionally not a portable communications device, but rather is a desktop computer or a television with a touch-sensitive surface (e.g., a touch screen display and/or a touch pad). In some examples, the device optionally does not have a touch screen display and/or a touch pad, but rather is capable of outputting display information (such as the user interfaces of the disclosure) for display on a separate display device, and is capable of receiving input information from a separate input device having one or more input mechanisms (such as one or more buttons, a touch screen display and/or a touch pad). In some examples, the device has a display, and optionally is capable of receiving input information from a separate input device having one or more input mechanisms (such as one or more buttons, a touch screen display and/or a touch pad).

In the discussion that follows, an electronic device that optionally includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed among two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device optionally supports a variety of applications, such as one or more of the following: a digital media player application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a television channel browsing application.

The various applications that are optionally executed on the device optionally use at least one common physical user-interface device, such as the touch-sensitive surface. One or more functions of the touch-sensitive surface as well as corresponding information displayed on the device are optionally adjusted and/or varied from one application to the next and/or within a respective application. In this way, a common physical architecture (such as the touch-sensitive surface) of the device optionally supports the variety of applications with user interfaces that are intuitive and transparent to the user.

Figure 13A:
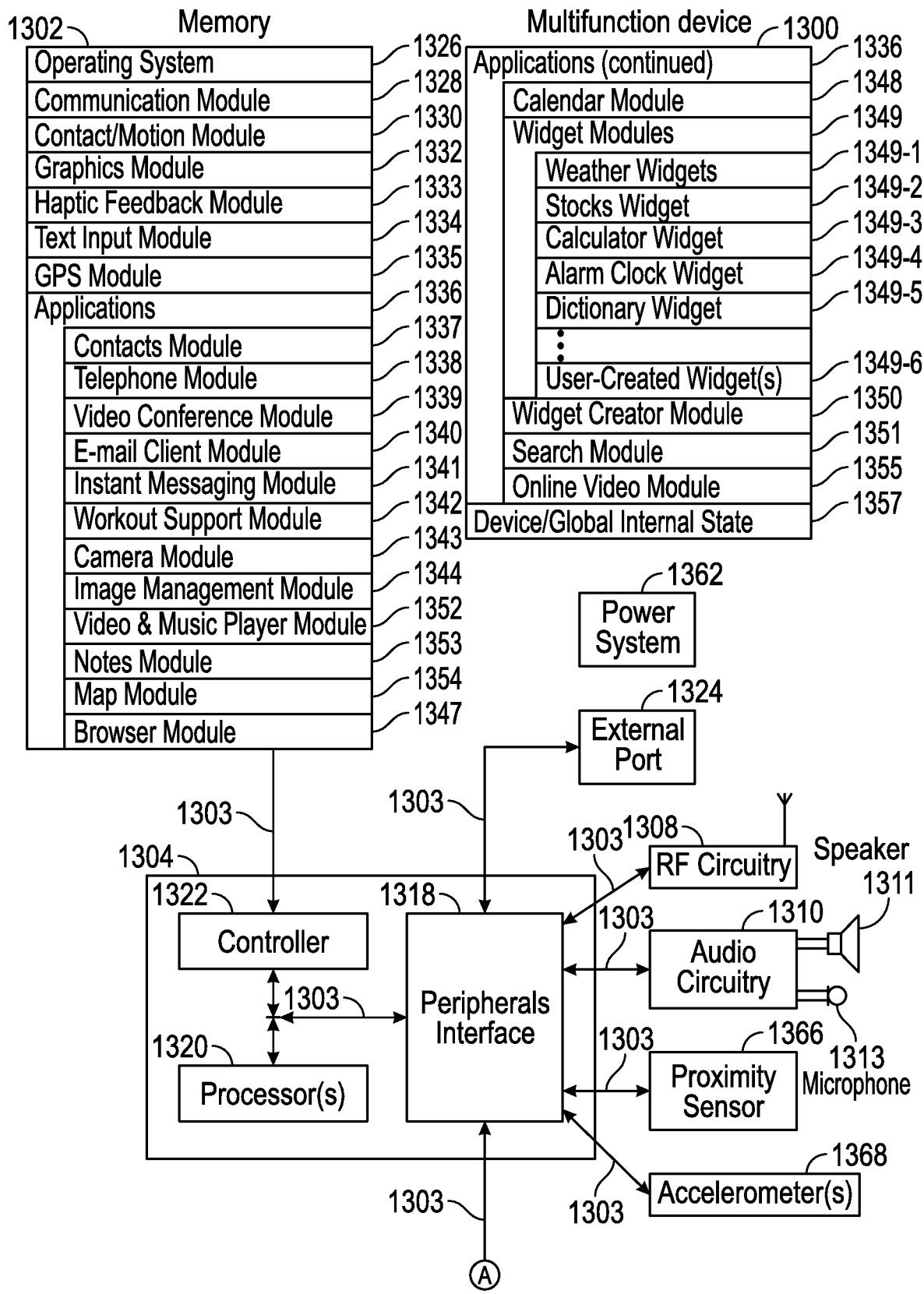
FIG. 13A is a block diagram illustrating an exemplary portable or non-portable multifunction device with touch-sensitive displays in accordance with some examples of the disclosure.
Figure 13A:
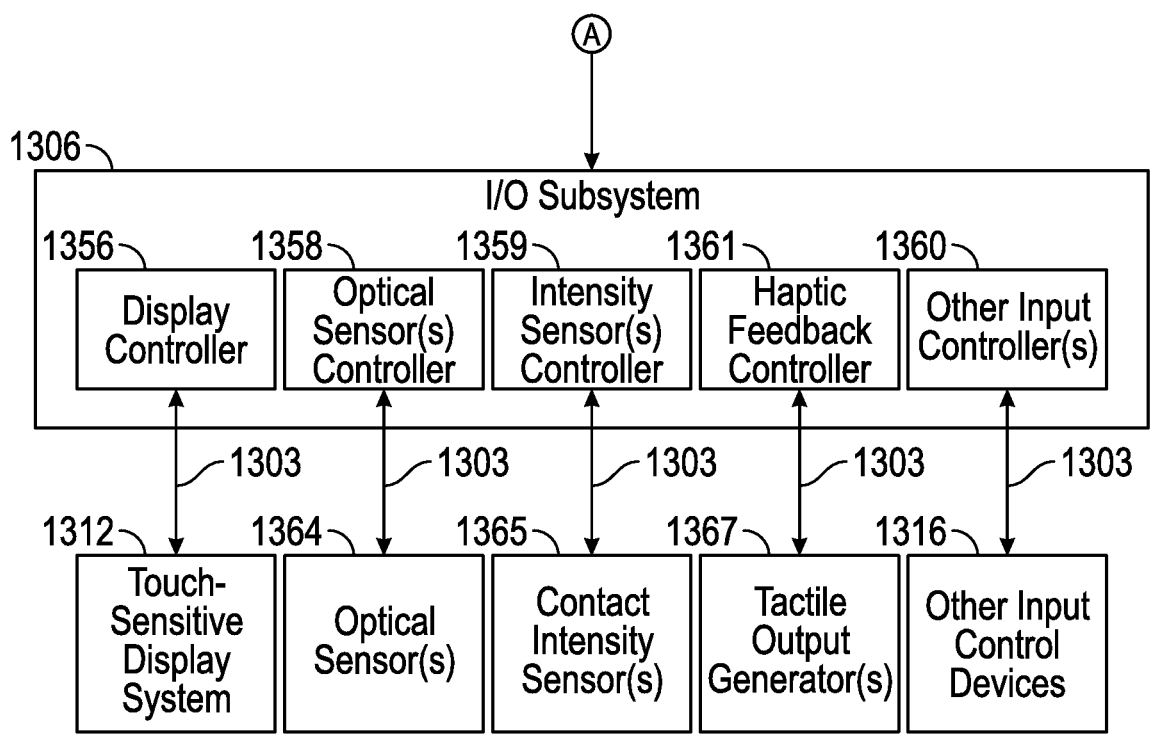

Attention is now directed toward examples of portable or non-portable devices with touch-sensitive displays, though the devices need not include touch-sensitive displays or displays in general, as described above. FIG. 13A is a block diagram illustrating an exemplary portable or non-portable multifunction device 1300 with touch-sensitive displays 1312 in accordance with some examples of the disclosure. Touch-sensitive display 1312 is sometimes called a "touch screen" for convenience, and is sometimes known as or called a touch-sensitive display system. Device 1300 optionally includes memory 1302 (which optionally includes one or more computer readable storage mediums), memory controller 1322, one or more processing units (CPU's) 1320, peripherals interface 1318, RF circuitry 1308, audio circuitry 1310, speaker 1311, microphone 1313, input/output (I/O) subsystem 1306, other input or control devices 1316, and external port 1324. Device 1300 optionally includes one or more optical sensors 1364. Device 1300 optionally includes one or more intensity sensors 1365 for detecting intensity of contacts on device 1300 (e.g., a touch-sensitive surface such as touch-sensitive display system 1312 of device 1300). Device 1300 optionally includes one or more tactile output generators 1367 for generating tactile outputs on device 1300 (e.g., generating tactile outputs on a touch-sensitive surface such as touch-sensitive display system 1312 of device 1300 or touchpad 1555 of device 1500). These components optionally communicate over one or more communication buses or signal lines 1303.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact optionally has a range of values that optionally includes at least four distinct values and more typically includes hundreds of distinct values (e.g., at least 256). Intensity of a contact is optionally determined (or measured) using various approaches and various sensors or combinations of sensors. For example, one or more force sensors underneath or adjacent to the touch-sensitive surface are optionally used to measure force at various points on the touch-sensitive surface. In some implementations, force measurements from multiple force sensors are optionally combined (e.g., a weighted average) to determine an estimated force of a contact. Similarly, a pressure-sensitive tip of a stylus is optionally used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are optionally used as a substitute for the force or pressure of the contact on the touch-sensitive surface. In some implementations, the substitute measurements for contact force or pressure are optionally used directly to determine whether an intensity threshold has been exceeded (e.g., the intensity threshold is described in units corresponding to the substitute measurements). In some implementations, the substitute measurements for contact force or pressure are optionally converted to an estimated force or pressure and the estimated force or pressure is optionally used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that is optionally detected by a user with the user's sense of touch. For example, in situations where the device or the component of the device is in contact with a surface of a user that is sensitive to touch (e.g., a finger, palm, or other part of a user's hand), the tactile output generated by the physical displacement is optionally interpreted by the user as a tactile sensation corresponding to a perceived change in physical characteristics of the device or the component of the device. For example, movement of a touch-sensitive surface (e.g., a touch-sensitive display or trackpad) is optionally interpreted by the user as a "down click" or "up click" of a physical actuator button. In some cases, a user optionally feels a tactile sensation such as an "down click" or "up click" even when there is no movement of a physical actuator button associated with the touch-sensitive surface that is physically pressed (e.g., displaced) by the user's movements. As another example, movement of the touch-sensitive surface is optionally interpreted or sensed by the user as "roughness" of the touch-sensitive surface, even when there is no change in smoothness of the touch-sensitive surface. While such interpretations of touch by a user can be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output optionally corresponds to physical displacement of the device or a component thereof that generates the described sensory perception for a typical (or average) user.

It should be appreciated that device 1300 is only one example of a portable or non-portable multifunction device, and that device 1300 optionally has more or fewer components than shown, optionally combines two or more components, or optionally has a different configuration or arrangement of the components. The various components shown in FIG. 13A are optionally implemented in hardware, software, or a combination of both hardware and software, including one or more signal processing and/or application specific integrated circuits. Further, the various components shown in FIG. 13A are optionally implemented across two or more devices; for example, a display and audio circuitry on a display device, a touch-sensitive surface on an input device, and remaining components on device 1300. In such an example, device 1300 optionally communicates with the display device and/or the input device to facilitate operation of the system, as described in the disclosure, and the various components described herein that relate to display and/or input remain in device 1300, or are optionally included in the display and/or input device, as appropriate.

Memory 1302 optionally includes high-speed random access memory and optionally also includes non-volatile memory, such as one or more magnetic disk storage devices, flash memory devices, or other non-volatile solid-state memory devices. Access to memory 1302 by other components of device 1300, such as CPU 1320 and the peripherals interface 1318, is optionally controlled by memory controller 1322.

Peripherals interface 1318 is optionally used to couple input and output peripherals of the device to CPU 1320 and memory 1302. The one or more processors 1320 optionally run or execute various software programs and/or sets of instructions stored in memory 1302 to perform various functions for device 1300 and to process data.

In some examples, peripherals interface 1318, CPU 1320, and memory controller 1322 are optionally implemented on a single chip, such as chip 1304. In other examples, they are optionally implemented on separate chips.

RF (radio frequency) circuitry 1308 optionally receives and sends RF signals, also called electromagnetic signals. RF circuitry 1308 optionally converts electrical signals to/from electromagnetic signals and communicates with communications networks and other communications devices via the electromagnetic signals. RF circuitry 1308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1310, speaker 1311, and microphone 1313 optionally provides an audio interface between a user and device 1300. Audio circuitry 1310 optionally receives audio data from peripherals interface 1318, converts the audio data to an electrical signal, and transmits the electrical signal to speaker 1311. Speaker 1311 optionally converts the electrical signal to human-audible sound waves. Audio circuitry 1310 optionally also receives electrical signals converted by microphone 1313 from sound waves. Audio circuitry 1310 optionally converts the electrical signal to audio data and transmit the audio data to peripherals interface 1318 for processing. Audio data is, optionally, retrieved from and/or transmitted to memory 1302 and/or RF circuitry 1308 by peripherals interface 1318. In some examples, audio circuitry 1310 optionally also includes a headset jack (e.g., 1412, FIG. 4). The headset jack optionally provides an interface between audio circuitry 1310 and removable audio input/output peripherals, such as output-only headphones or a headset with both output (e.g., a headphone for one or both ears) and input (e.g., a microphone).

I/O subsystem 1306 optionally couples input/output peripherals on device 1300, such as touch screen 1312 and other input control devices 1316, to peripherals interface 1318. I/O subsystem 1306 optionally includes display controller 1356, optical sensor controller 1358, intensity sensor controller 1359, haptic feedback controller 1361 and one or more input controllers 1360 for other input or control devices. The one or more input controllers 1360 optionally receive/send electrical signals from/to other input or control devices 1316. The other input control devices 1316 optionally include physical buttons (e.g., push buttons, rocker buttons, etc.), dials, slider switches, joysticks, click wheels, and so forth. In some alternate examples, input controller(s) 1360 are, optionally, coupled to any (or none) of the following: a keyboard, infrared port, USB port, and a pointer device such as a mouse. The one or more buttons (e.g., 208, FIG. 2) optionally include an up/down button for volume control of speaker 1311 and/or microphone 1313. The one or more buttons optionally include a push button (e.g., 1406, FIG. 14).

Touch-sensitive display 1312 optionally provides an input interface and an output interface between the device and a user. As described above, the touch-sensitive operation and the display operation of touch-sensitive display 1312 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 1356 optionally receives and/or sends electrical signals from/to touch screen 1312. Touch screen 1312 optionally displays visual output to the user. The visual output optionally includes graphics, text, icons, video, and any combination thereof (collectively termed "graphics"). In some examples, some or all of the visual output corresponds to user-interface objects.

Touch screen 1312 optionally has a touch-sensitive surface, sensor or set of sensors that accepts input from the user based on haptic and/or tactile contact. Touch screen 1312 and display controller 1356 (along with any associated modules and/or sets of instructions in memory 1302) optionally detects contact (and any movement or breaking of the contact) on touch screen 1312 and converts the detected contact into interaction with user-interface objects (e.g., one or more soft keys, icons, web pages or images) that are displayed on touch screen 1312. In one example, a point of contact between touch screen 1312 and the user corresponds to a finger of the user.

Touch screen 1312 optionally uses LCD (liquid crystal display) technology, LPD (light emitting polymer display) technology, or LED (light emitting diode) technology, although other display technologies are used in other examples. Touch screen 1312 and display controller 1356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 1312. In an example, projected mutual capacitance sensing technology is used, such as that found in the iPhone®, iPod Touch®, and iPad® from Apple Inc. of Cupertino, Calif.

Touch screen 1312 optionally has a video resolution in excess of 100 dpi. In some examples, the touch screen optionally has a video resolution of approximately 160 dpi. The user optionally makes contact with touch screen 1312 using any suitable object or appendage, such as a stylus, a finger, and so forth. In some examples, the user interface is optionally designed to work primarily with finger-based contacts and gestures, which are less precise than stylus-based input due to the larger area of contact of a finger on the touch screen. In some examples, the device optionally translates the rough finger-based input into a precise pointer/cursor position or command for performing the actions desired by the user.

In some examples, in addition to the touch screen, device 1300 optionally includes a touchpad (not shown) for activating or deactivating particular functions. In some examples, the touchpad is optionally a touch-sensitive area of the device that, unlike the touch screen, does not display visual output. The touchpad is, optionally, a touch-sensitive surface that is separate from touch screen 1312 or an extension of the touch-sensitive surface formed by the touch screen.

Device 1300 optionally also includes power system 1362 for powering the various components. Power system 1362 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 1300 optionally also includes one or more optical sensors 1364. FIG. 13A shows an example optical sensor coupled to optical sensor controller 1358 in I/O subsystem 1306. Optical sensor 1364 optionally includes charge-coupled device (CCD) or complementary metal-oxide semiconductor (CMOS) phototransistors. Optical sensor 1364 optionally receives light from the environment, projected through one or more lenses, and converts the light to data representing an image. In conjunction with imaging module 1343 (also called a camera module), optical sensor 1364 optionally captures still images or video. In some examples, an optical sensor is optionally located on the back of device 1300, opposite touch screen display 1312 on the front of the device, so that the touch screen display is enabled for use as a viewfinder for still and/or video image acquisition. In some examples, another optical sensor is optionally located on the front of the device so that the user's image is, optionally, obtained for videoconferencing while the user views the other video conference participants on the touch screen display.

Device 1300 optionally also includes one or more contact intensity sensors 1365. FIG. 13A shows an example contact intensity sensor coupled to intensity sensor controller 1359 in I/O subsystem 1306. Contact intensity sensor 1365 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 1365 optionally receives contact intensity information (e.g., pressure information or a proxy for pressure information) from the environment. In some examples, at least one contact intensity sensor is optionally collocated with, or proximate to, a touch-sensitive surface (e.g., touch-sensitive display system 1312). In some examples, at least one contact intensity sensor is optionally located on the back of device 1300, opposite touch screen display 1312 which is located on the front of device 1300.

Device 1300 optionally also includes one or more proximity sensors 1366. FIG. 13A shows example proximity sensor 1366 coupled to peripherals interface 1318. Alternately, proximity sensor 1366 is optionally coupled to input controller 1360 in I/O subsystem 1306. In some examples, the proximity sensor optionally turns off and disables touch screen 1312 when the multifunction device is placed near the user's ear (e.g., when the user is making a phone call).

Device 1300 optionally also includes one or more tactile output generators 1367. FIG. 13A shows an example tactile output generator coupled to haptic feedback controller 1361 in I/O subsystem 1306. Tactile output generator 1367 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 1365 optionally receives tactile feedback generation instructions from haptic feedback module 1333 and generates tactile outputs on device 1300 that are sensed by a user of device 1300. In some examples, at least one tactile output generator is optionally collocated with, or proximate to, a touch-sensitive surface (e.g., touch-sensitive display system 1312) and, optionally, generates a tactile output by moving the touch-sensitive surface vertically (e.g., in/out of a surface of device 1300) or laterally (e.g., back and forth in the same plane as a surface of device 1300). In some examples, at least one tactile output generator sensor is optionally located on the back of device 1300, opposite touch screen display 1312 which is located on the front of device 1300.

Device 1300 optionally also includes one or more accelerometers 1368. FIG. 13A shows example accelerometer 1368 coupled to peripherals interface 1318. Alternately, accelerometer 1368 is, optionally, coupled to an input controller 1360 in I/O subsystem 1306. In some examples, information is optionally displayed on the touch screen display in a portrait view or a landscape view based on an analysis of data received from the one or more accelerometers. Device 1300 optionally includes, in addition to accelerometer(s) 1368, a magnetometer (not shown) and a GPS (or GLONASS or other global navigation system) receiver (not shown) for obtaining information concerning the location and orientation (e.g., portrait or landscape) of device 1300.

Figure 15:
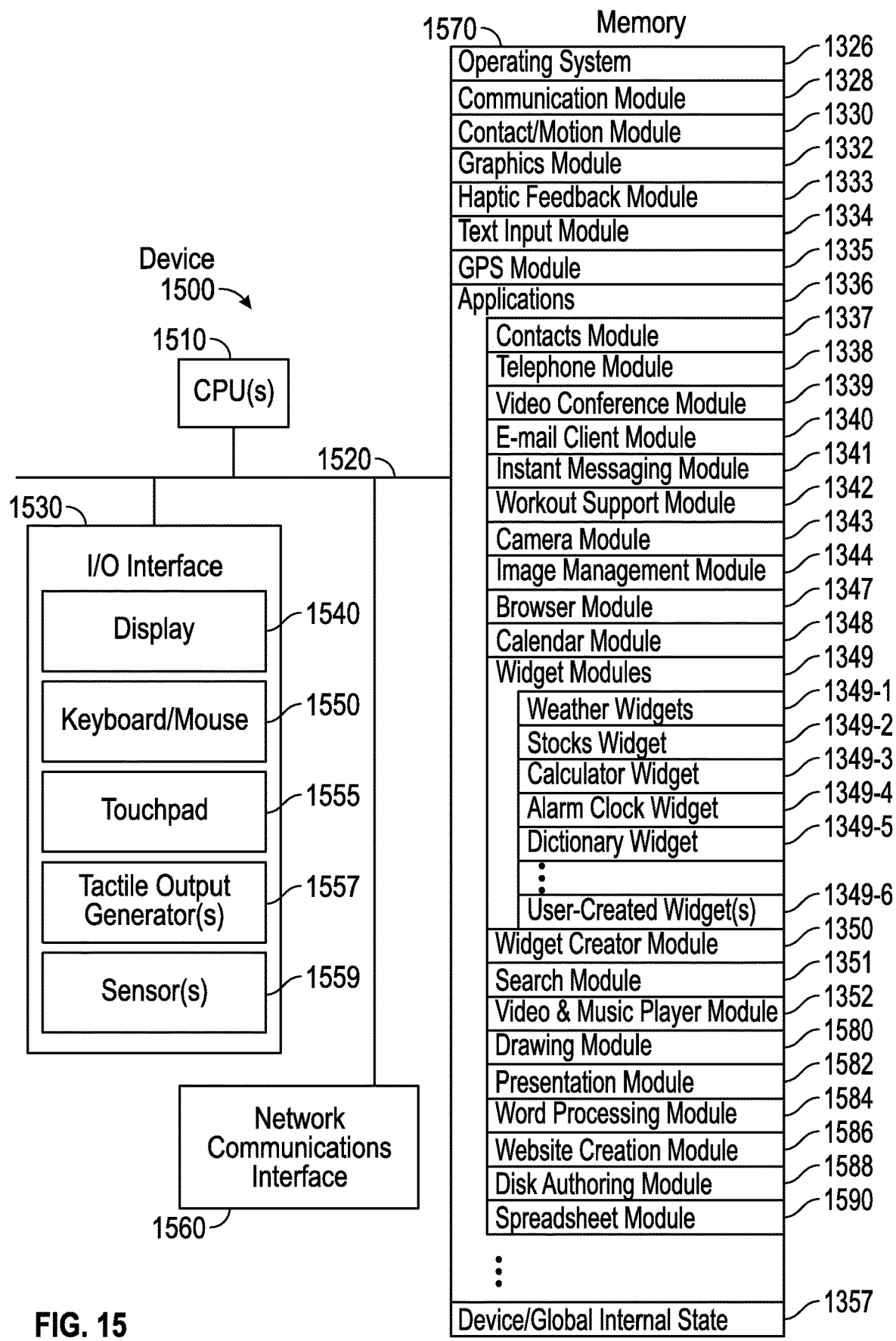
FIG. 15 is a block diagram of an exemplary multifunction device with a display and a touch-sensitive surface in accordance with some examples of the disclosure.

In some examples, the software components stored in memory 1302 optionally include operating system 1326, communication module (or set of instructions) 1328, contact/motion module (or set of instructions) 1330, graphics module (or set of instructions) 1332, text input module (or set of instructions) 1334, Global Positioning System (GPS) module (or set of instructions) 1335, and applications (or sets of instructions) 1336. Furthermore, in some examples, memory 1302 optionally stores device/global internal state 1357, as shown in FIGS. 13A and 15. Device/global internal state 1357 optionally includes one or more of: active application state, indicating which applications, if any, are currently active; display state, indicating what applications, views or other information occupy various regions of touch screen display 1312; sensor state, including information obtained from the device's various sensors and input control devices 1316; and location information concerning the device's location and/or attitude.

Operating system 1326 (e.g., Darwin, RTXC, LINUX, UNIX, OS X, WINDOWS, or an embedded operating system such as VxWorks) optionally includes various software components and/or drivers for controlling and managing general system tasks (e.g., memory management, storage device control, power management, etc.) and facilitates communication between various hardware and software components.

Communication module 1328 optionally facilitates communication with other devices over one or more external ports 1324 and also includes various software components for handling data received by RF circuitry 1308 and/or external port 1324. External port 1324 (e.g., Universal Serial Bus (USB), FIREWIRE, etc.) is optionally adapted for coupling directly to other devices or indirectly over a network (e.g., the Internet, wireless LAN, etc.). In some examples, the external port is optionally a multi-pin (e.g., 30-pin) connector that is the same as, or similar to and/or compatible with the 30-pin connector used on iPod (trademark of Apple Inc.) devices.

Contact/motion module 1330 optionally detects contact with touch screen 1312 (in conjunction with display controller 1356) and other touch-sensitive devices (e.g., a touchpad or physical click wheel). Contact/motion module 1330 optionally includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 1330 optionally receives contact data from the touch-sensitive surface. Determining movement of the point of contact, which is optionally represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some examples, contact/motion module 1330 and display controller 1356 optionally detect contact on a touchpad.

In some examples, contact/motion module 1330 optionally uses a set of one or more intensity thresholds to determine whether an operation has been performed by a user (e.g., to determine whether a user has "clicked" on an icon). In some examples, at least a subset of the intensity thresholds is optionally determined in accordance with software parameters (e.g., the intensity thresholds are not determined by the activation thresholds of particular physical actuators and are adjusted without changing the physical hardware of device 1300). For example, a mouse "click" threshold of a trackpad or touch screen display is optionally set to any of a large range of predefined thresholds values without changing the trackpad or touch screen display hardware. Additionally, in some implementations, a user of the device is optionally provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 1330 optionally detects a gesture input by a user. Different gestures on the touch-sensitive surface optionally have different contact patterns and intensities. Thus, a gesture is, optionally, detected by detecting a particular contact pattern. For example, detecting a finger tap gesture optionally includes detecting a finger-down event followed by detecting a finger-up (lift off) event at the same position (or substantially the same position) as the finger-down event (e.g., at the position of an icon). As another example, detecting a finger swipe gesture on the touch-sensitive surface optionally includes detecting a finger-down event followed by detecting one or more finger-dragging events, subsequently followed by detecting a finger-up (lift off) event.

Graphics module 1332 optionally includes various known software components for rendering and displaying graphics on touch screen 1312 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some examples, graphics module 1332 optionally stores data representing graphics to be used. Each graphic is, optionally, assigned a corresponding code. Graphics module 1332 optionally receives, from applications etc., one or more codes specifying graphics to be displayed along with, if necessary, coordinate data and other graphic property data, and then generates screen image data to output to display controller 1356.

Haptic feedback module 1333 optionally includes various software components for generating instructions used by tactile output generator(s) 1367 to produce tactile outputs at one or more locations on device 1300 in response to user interactions with device 1300.

Text input module 1334, which is, optionally, a component of graphics module 1332, optionally provides soft keyboards for entering text in various applications (e.g., contacts 1337, e-mail 1340, 1M 1341, browser 1347, and any other application that needs text input).

GPS module 1335 optionally determines the location of the device and provides this information for use in various applications (e.g., to telephone 1338 for use in location-based dialing, to camera 1343 as picture/video metadata, and to applications that provide location-based services such as weather widgets, local yellow page widgets, and map/navigation widgets).

Applications 1336 optionally include the following modules (or sets of instructions), or a subset or superset thereof:
- contacts module 1337 (sometimes called an address book or contact list);
- telephone module 1338;
- video conferencing module 1339;
- e-mail client module 1340;
- instant messaging (IM) module 1341;
- workout support module 1342;
- camera module 1343 for still and/or video images;
- image management module 1344;
- browser module 1347;
- calendar module 1348;
- widget modules 1349, which optionally include one or more of: weather widget 1349-1, stocks widget 1349-2, calculator widget 1349-3, alarm clock widget 1349-4, dictionary widget 1349-5, and other widgets obtained by the user, as well as user-created widgets 1349-6;
- widget creator module 1350 for making user-created widgets 1349-6;
- search module 1351;
- video and music player module 1352, which is, optionally, made up of a video player module and a music player module;
- notes module 1353;
- map module 1354;
- online video module 1355.

Examples of other applications 1336 that are, optionally, stored in memory 1302 include other word processing applications, other image editing applications, drawing applications, presentation applications, JAVA-enabled applications, encryption, digital rights management, voice recognition, and voice replication.

In conjunction with touch screen 1312, display controller 1356, contact module 1330, graphics module 1332, and text input module 1334, contacts module 1337 is, optionally, used to manage an address book or contact list (e.g., stored in application internal state 1392 of contacts module 1337 in memory 1302 or memory 1570), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1338, video conference 1339, e-mail 1340, or IM 1341; and so forth.

In conjunction with RF circuitry 1308, audio circuitry 1310, speaker 1311, microphone 1313, touch screen 1312, display controller 1356, contact module 1330, graphics module 1332, and text input module 1334, telephone module 1338 is optionally used to enter a sequence of characters corresponding to a telephone number, access one or more telephone numbers in address book 1337, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 1308, audio circuitry 1310, speaker 1311, microphone 1313, touch screen 1312, display controller 1356, optical sensor 1364, optical sensor controller 1358, contact module 1330, graphics module 1332, text input module 1334, contact list 1337, and telephone module 1338, videoconferencing module 1339 optionally includes executable instructions to initiate, conduct, and terminate a video conference between a user and one or more other participants in accordance with user instructions.

In conjunction with RF circuitry 1308, touch screen 1312, display controller 1356, contact module 1330, graphics module 1332, and text input module 1334, e-mail client module 1340 optionally includes executable instructions to create, send, receive, and manage e-mail in response to user instructions. In conjunction with image management module 1344, e-mail client module 1340 optionally makes it possible to create and send e-mails with still or video images taken with camera module 1343.

In conjunction with RF circuitry 1308, touch screen 1312, display controller 1356, contact module 1330, graphics module 1332, and text input module 1334, the instant messaging module 1341 optionally includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some examples, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1308, touch screen 1312, display controller 1356, contact module 1330, graphics module 1332, text input module 1334, GPS module 1335, map module 1354, and music player module 1346, workout support module 1342 optionally includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1312, display controller 1356, optical sensor(s) 1364, optical sensor controller 1358, contact module 1330, graphics module 1332, and image management module 1344, camera module 1343 optionally includes executable instructions to capture still images or video (including a video stream) and store them into memory 1302, modify characteristics of a still image or video, or delete a still image or video from memory 1302.

In conjunction with touch screen 1312, display controller 1356, contact module 1330, graphics module 1332, text input module 1334, and camera module 1343, image management module 1344 optionally includes executable instructions to arrange, modify (e.g., edit), or otherwise manipulate, label, delete, present (e.g., in a digital slide show or album), and store still and/or video images.

In conjunction with RF circuitry 1308, touch screen 1312, display system controller 1356, contact module 1330, graphics module 1332, and text input module 1334, browser module 1347 optionally includes executable instructions to browse the Internet in accordance with user instructions, including searching, linking to, receiving, and displaying web pages or portions thereof, as well as attachments and other files linked to web pages.

In conjunction with RF circuitry 1308, touch screen 1312, display system controller 1356, contact module 1330, graphics module 1332, text input module 1334, e-mail client module 1340, and browser module 1347, calendar module 1348 optionally includes executable instructions to create, display, modify, and store calendars and data associated with calendars (e.g., calendar entries, to do lists, etc.) in accordance with user instructions.

In conjunction with RF circuitry 1308, touch screen 1312, display system controller 1356, contact module 1330, graphics module 1332, text input module 1334, and browser module 1347, widget modules 1349 are mini-applications that are, optionally, downloaded and used by a user (e.g., weather widget 1349-1, stocks widget 1349-2, calculator widget 1349-3, alarm clock widget 1349-4, and dictionary widget 1349-5) or created by the user (e.g., user-created widget 1349-6). In some examples, a widget optionally includes an HTML (Hypertext Markup Language) file, a CSS (Cascading Style Sheets) file, and a JavaScript file. In some examples, a widget optionally includes an XML (Extensible Markup Language) file and a JavaScript file (e.g., Yahoo! Widgets).

In conjunction with RF circuitry 1308, touch screen 1312, display system controller 1356, contact module 1330, graphics module 1332, text input module 1334, and browser module 1347, the widget creator module 1350 is, optionally, used by a user to create widgets (e.g., turning a user-specified portion of a web page into a widget).

In conjunction with touch screen 1312, display system controller 1356, contact module 1330, graphics module 1332, and text input module 1334, search module 1351 optionally includes executable instructions to search for text, music, sound, image, video, and/or other files in memory 1302 that match one or more search criteria (e.g., one or more user-specified search terms) in accordance with user instructions.

In conjunction with touch screen 1312, display system controller 1356, contact module 1330, graphics module 1332, audio circuitry 1310, speaker 1311, RF circuitry 1308, and browser module 1347, video and music player module 1352 optionally includes executable instructions that optionally allow the user to download and play back recorded music and other sound files stored in one or more file formats, such as MP3 or AAC files, and executable instructions to display, present or otherwise play back videos (e.g., on touch screen 1312 or on an external, connected display via external port 1324). In some examples, device 1300 optionally includes the functionality of an MP3 player, such as an iPod (trademark of Apple Inc.).

In conjunction with touch screen 1312, display controller 1356, contact module 1330, graphics module 1332, and text input module 1334, notes module 1353 optionally includes executable instructions to create and manage notes, to do lists, and the like in accordance with user instructions.

In conjunction with RF circuitry 1308, touch screen 1312, display system controller 1356, contact module 1330, graphics module 1332, text input module 1334, GPS module 1335, and browser module 1347, map module 1354 is, optionally, used to receive, display, modify, and store maps and data associated with maps (e.g., driving directions; data on stores and other points of interest at or near a particular location; and other location-based data) in accordance with user instructions.

In conjunction with touch screen 1312, display system controller 1356, contact module 1330, graphics module 1332, audio circuitry 1310, speaker 1311, RF circuitry 1308, text input module 1334, e-mail client module 1340, and browser module 1347, online video module 1355 optionally includes instructions that allow the user to access, browse, receive (e.g., by streaming and/or download), play back (e.g., on the touch screen or on an external, connected display via external port 1324), send an e-mail with a link to a particular online video, and otherwise manage online videos in one or more file formats, such as H.264. In some examples, instant messaging module 1341, rather than e-mail client module 1340, is optionally used to send a link to a particular online video.

Each of the above identified modules and applications optionally correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various examples. In some examples, memory 1302 optionally stores a subset of the modules and data structures identified above. Furthermore, memory 1302 optionally stores additional modules and data structures not described above.

In some examples, device 1300 is a device where operation of a predefined set of functions on the device is optionally performed exclusively through a touch screen and/or a touchpad (whether included in device 1300 or on a separate device, such as an input device). By using a touch screen and/or a touchpad as the primary input control device for operation of device 1300, the number of physical input control devices (such as push buttons, dials, and the like) on device 1300 is, optionally, reduced.

The predefined set of functions that can be performed exclusively through a touch screen and/or a touchpad optionally include navigation between user interfaces. In some examples, the touchpad, when touched by the user, optionally navigates device 1300 to a main, home, or root menu from any user interface that is displayed on device 1300. In such examples, a "menu button" is optionally implemented using a touchpad. In some other examples, the menu button is optionally a physical push button or other physical input control device instead of a touchpad.

Figure 13B:
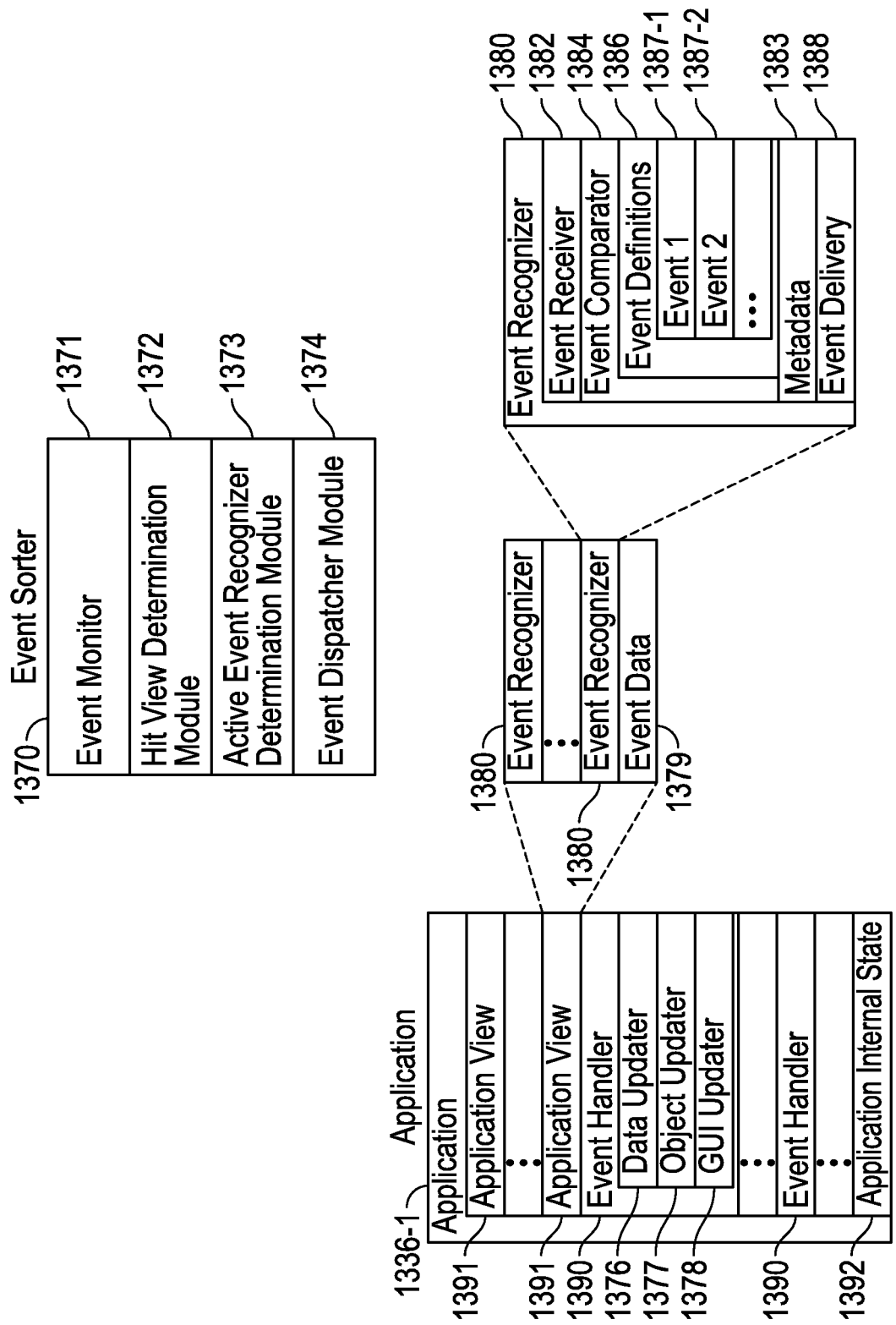
FIG. 13B is a block diagram illustrating exemplary components for event handling in accordance with some examples of the disclosure.

FIG. 13B is a block diagram illustrating exemplary components for event handling in accordance with some examples of the disclosure. In some examples, memory 1302 (in FIG. 13A) or 1570 (FIG. 15) optionally includes event sorter 1370 (e.g., in operating system 1326) and a respective application 1336-1 (e.g., any of the aforementioned applications 1337-1351, 1355, 1580-1590).

Event sorter 1370 optionally receives event information and determines the application 1336-1 and application view 1391 of application 1336-1 to which to deliver the event information. Event sorter 1370 optionally includes event monitor 1371 and event dispatcher module 1374. In some examples, application 1336-1 optionally includes application internal state 1392, which indicates the current application view(s) displayed on touch-sensitive display 1312 when the application is active or executing. In some examples, device/global internal state 1357 is optionally used by event sorter 1370 to determine which application(s) is (are) currently active, and application internal state 1392 is used by event sorter 1370 to determine application views 1391 to which to deliver event information.

In some examples, application internal state 1392 optionally includes additional information, such as one or more of: resume information to be used when application 1336-1 resumes execution, user interface state information that indicates information being displayed or that is ready for display by application 1336-1, a state queue for enabling the user to go back to a prior state or view of application 1336-1, and a redo/undo queue of previous actions taken by the user.

Event monitor 1371 optionally receives event information from peripherals interface 1318. Event information optionally includes information about a sub-event (e.g., a user touch on touch-sensitive display 1312, as part of a multi-touch gesture). Peripherals interface 1318 optionally transmits information it receives from I/O subsystem 1306 or a sensor, such as proximity sensor 1366, accelerometer(s) 1368, and/or microphone 1313 (through audio circuitry 1310). Information that peripherals interface 1318 receives from I/O subsystem 1306 optionally includes information from touch-sensitive display 1312 or a touch-sensitive surface.

In some examples, event monitor 1371 optionally sends requests to the peripherals interface 1318 at predetermined intervals. In response, peripherals interface 1318 optionally transmits event information. In other examples, peripheral interface 1318 optionally transmits event information only when there is a significant event (e.g., receiving an input above a predetermined noise threshold and/or for more than a predetermined duration).

In some examples, event sorter 1370 optionally also includes a hit view determination module 1372 and/or an active event recognizer determination module 1373.

Hit view determination module 1372 optionally provides software procedures for determining where a sub-event has taken place within one or more views, when touch-sensitive display 1312 displays more than one view. Views are optionally made up of controls and other elements that a user can see on the display.

Another aspect of the user interface that is optionally associated with an application is a set of views, sometimes herein called application views or user interface windows, in which information is optionally displayed and touch-based gestures optionally occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 1372 optionally receives information related to sub-events of a touch-based gesture. When an application has multiple views organized in a hierarchy, hit view determination module 1372 optionally identifies a hit view as the lowest view in the hierarchy which should handle the sub-event. In most circumstances, the hit view is optionally the lowest level view in which an initiating sub-event can occur (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 1373 optionally determines which view or views within a view hierarchy should receive a particular sequence of sub-events. In some examples, active event recognizer determination module 1373 optionally determines that only the hit view should receive a particular sequence of sub-events. In other examples, active event recognizer determination module 1373 optionally determines that all views that include the physical location of a sub-event are actively involved views, and therefore determines that all actively involved views should receive a particular sequence of sub-events. In other examples, even if touch sub-events were entirely confined to the area associated with one particular view, views higher in the hierarchy would still remain as actively involved views.

Event dispatcher module 1374 optionally dispatches the event information to an event recognizer (e.g., event recognizer 1380). In examples, including active event recognizer determination module 1373, event dispatcher module 1374 optionally delivers the event information to an event recognizer determined by active event recognizer determination module 1373. In some examples, event dispatcher module 1374 optionally stores in an event queue the event information, which is optionally retrieved by a respective event receiver module 1382.

In some examples, operating system 1326 optionally includes event sorter 1370. Alternatively, application 1336-1 optionally includes event sorter 1370. In yet other examples, event sorter 1370 is optionally a stand-alone module, or a part of another module stored in memory 1302, such as contact/motion module 1330.

In some examples, application 1336-1 optionally includes a plurality of event handlers 1390 and one or more application views 1391, each of which includes instructions for handling touch events that occur within a respective view of the application's user interface. Each application view 1391 of the application 1336-1 optionally includes one or more event recognizers 1380. Typically, a respective application view 1391 optionally includes a plurality of event recognizers 1380. In other examples, one or more of event recognizers 1380 are optionally a part of a separate module, such as a user interface kit (not shown) or a higher level object from which application 1336-1 inherits methods and other properties. In some examples, a respective event handler 1390 optionally includes one or more of: data updater 1376, object updater 1377, GUI updater 1378, and/or event data 1379 received from event sorter 1370. Event handler 1390 optionally utilizes or calls data updater 1376, object updater 1377 or GUI updater 1378 to update the application internal state 1392. Alternatively, one or more of the application views 1391 optionally includes one or more respective event handlers 1390. Also, in some examples, one or more of data updater 1376, object updater 1377, and GUI updater 1378 are optionally included in a respective application view 1391.

A respective event recognizer 1380 optionally receives event information (e.g., event data 1379) from event sorter 1370, and identifies an event from the event information. Event recognizer 1380 optionally includes event receiver 1382 and event comparator 1384. In some examples, event recognizer 1380 also optionally includes at least a subset of: metadata 1383, and event delivery instructions 1388 (which optionally include sub-event delivery instructions).

Event receiver 1382 optionally receives event information from event sorter 1370. The event information optionally includes information about a sub-event, for example, a touch or a touch movement. Depending on the sub-event, the event information also optionally includes additional information, such as location of the sub-event. When the sub-event concerns motion of a touch, the event information optionally also includes speed and direction of the sub-event. In some examples, events optionally include rotation of the device from one orientation to another (e.g., from a portrait orientation to a landscape orientation, or vice versa), and the event information includes corresponding information about the current orientation (also called device attitude) of the device.

Event comparator 1384 optionally compares the event information to predefined event or sub-event definitions and, based on the comparison, determines an event or sub-event, or determines or updates the state of an event or sub-event. In some examples, event comparator 1384 optionally includes event definitions 1386. Event definitions 1386 optionally contain definitions of events (e.g., predefined sequences of sub-events), for example, event 1 (1387-1), event 2 (1387-2), and others. In some examples, sub-events in an event 1387 optionally include, for example, touch begin, touch end, touch movement, touch cancellation, and multiple touching. In one example, the definition for event 1 (1387-1) is optionally a double tap on a displayed object. The double tap, for example, optionally comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (1387-2) is optionally a dragging on a displayed object. The dragging, for example, optionally comprises a touch (or contact) on the displayed object for a predetermined phase, a movement of the touch across touch-sensitive display 1312, and lift-off of the touch (touch end). In some examples, the event optionally also includes information for one or more associated event handlers 1390.

In some examples, event definition 1387 optionally includes a definition of an event for a respective user-interface object. In some examples, event comparator 1384 optionally performs a hit test to determine which user-interface object is associated with a sub-event. For example, in an application view in which three user-interface objects are displayed on touch-sensitive display 1312, when a touch is detected on touch-sensitive display 1312, event comparator 1384 optionally performs a hit test to determine which of the three user-interface objects is associated with the touch (sub-event). If each displayed object is associated with a respective event handler 1390, the event comparator optionally uses the result of the hit test to determine which event handler 1390 should be activated. For example, event comparator 1384 selects an event handler associated with the sub-event and the object triggering the hit test.

In some examples, the definition for a respective event 1387 optionally also includes delayed actions that delay delivery of the event information until after it has been determined whether the sequence of sub-events does or does not correspond to the event recognizer's event type.

When a respective event recognizer 1380 determines that the series of sub-events do not match any of the events in event definitions 1386, the respective event recognizer 1380 optionally enters an event impossible, event failed, or event ended state, after which it disregards subsequent sub-events of the touch-based gesture. In this situation, other event recognizers, if any, that remain active for the hit view optionally continue to track and process sub-events of an ongoing touch-based gesture.

In some examples, a respective event recognizer 1380 optionally includes metadata 1383 with configurable properties, flags, and/or lists that indicate how the event delivery system should perform sub-event delivery to actively involved event recognizers. In some examples, metadata 1383 optionally includes configurable properties, flags, and/or lists that indicate how event recognizers interact, or are enabled to interact, with one another. In some examples, metadata 1383 optionally includes configurable properties, flags, and/or lists that indicate whether sub-events are delivered to varying levels in the view or programmatic hierarchy.

In some examples, a respective event recognizer 1380 optionally activates event handler 1390 associated with an event when one or more particular sub-events of an event are recognized. In some examples, a respective event recognizer 1380 optionally delivers event information associated with the event to event handler 1390. Activating an event handler 1390 is distinct from sending (and deferred sending) sub-events to a respective hit view. In some examples, event recognizer 1380 optionally throws a flag associated with the recognized event, and event handler 1390 associated with the flag optionally catches the flag and performs a predefined process.

In some examples, event delivery instructions 1388 optionally include sub-event delivery instructions that deliver event information about a sub-event without activating an event handler. Instead, the sub-event delivery instructions optionally deliver event information to event handlers associated with the series of sub-events or to actively involved views. Event handlers associated with the series of sub-events or with actively involved views receive the event information and perform a predetermined process.

In some examples, data updater 1376 optionally creates and updates data used in application 1336-1. For example, data updater 1376 optionally updates the telephone number used in contacts module 1337, or stores a video file used in video player module 1345. In some examples, object updater 1377 optionally creates and updates objects used in application 1336-1. For example, object updater 1376 optionally creates a new user-interface object or updates the position of a user-interface object. GUI updater 1378 updates the GUI. For example, GUI updater 1378 optionally prepares display information and sends it to graphics module 1332 for display on a touch-sensitive display.

In some examples, event handler(s) 1390 optionally includes or has access to data updater 1376, object updater 1377, and GUI updater 1378. In some examples, data updater 1376, object updater 1377, and GUI updater 1378 are optionally included in a single module of a respective application 1336-1 or application view 1391. In other examples, they are optionally included in two or more software modules.

It shall be understood that the foregoing discussion regarding event handling of user touches on touch-sensitive displays and/or touchpads optionally also apply to other forms of user inputs to operate multifunction devices 1300 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 14:
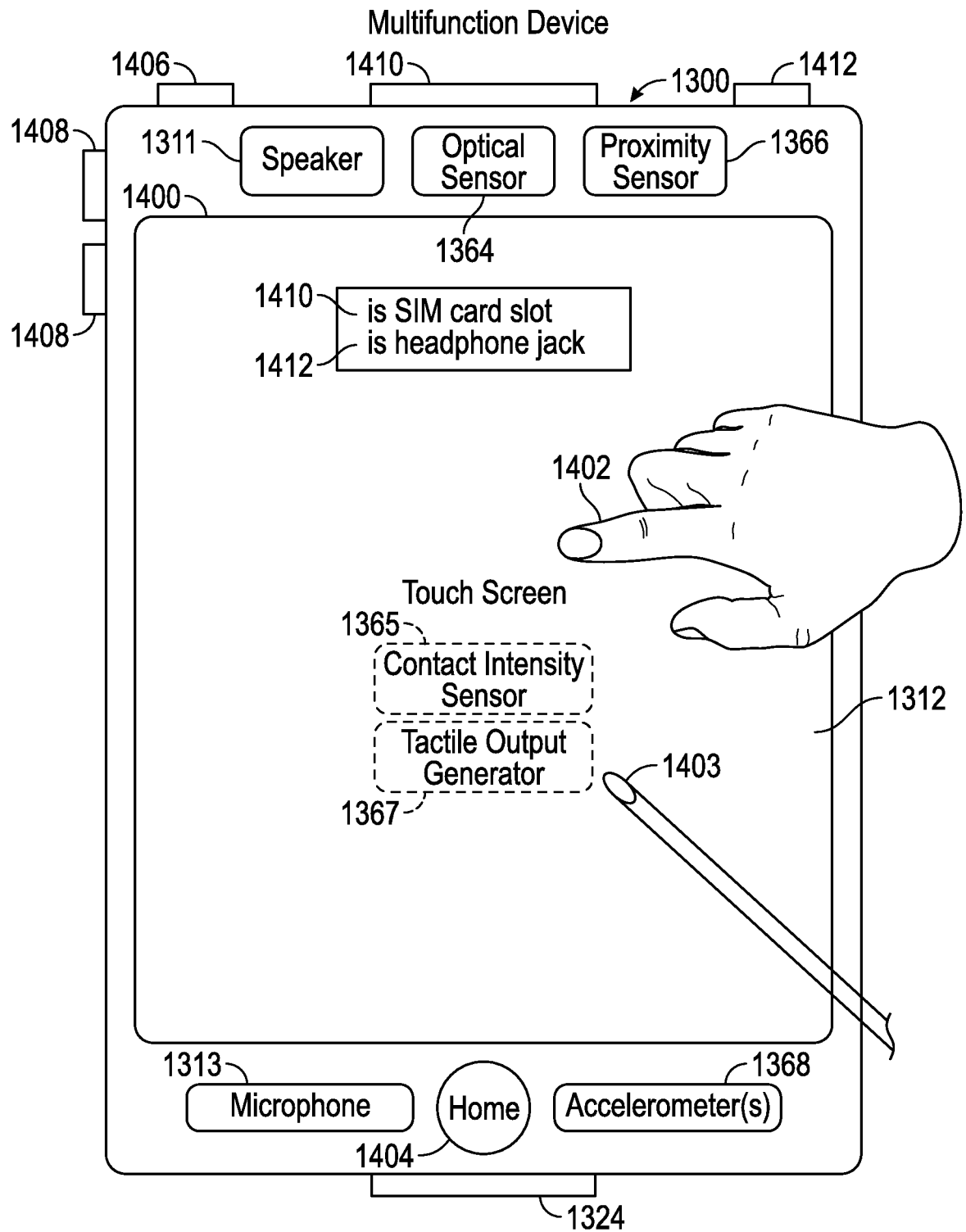
FIG. 14 illustrates an example portable or non-portable multifunction device having a touch screen in accordance with some examples of the disclosure.

FIG. 14 illustrates an example portable or non-portable multifunction device 1300 having a touch screen 1312 in accordance with some examples of the disclosure. As stated above, multifunction device 1300 optionally includes the various illustrated structures (such as touch screen 1312, speaker 1311, accelerometer 1368, microphone 1313, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 1300.

The touch screen 1312 optionally displays one or more graphics within user interface (UI) 1400. In this example, as well as others described below, a user can be enabled to select one or more of the graphics by making a gesture on the graphics, for example, with one or more fingers 1402 (not drawn to scale in the figure) or one or more styluses 1403 (not drawn to scale in the figure). In some examples, selection of one or more graphics optionally occurs when the user breaks contact with the one or more graphics. In some examples, the gesture optionally includes one or more taps, one or more swipes (from left to right, right to left, upward and/or downward) and/or a rolling of a finger (from right to left, left to right, upward and/or downward) that has made contact with device 1300. In some implementations or circumstances, inadvertent contact with a graphic does not select the graphic. For example, a swipe gesture that sweeps over an application icon optionally does not select the corresponding application when the gesture corresponding to selection is a tap.

Device 1300 optionally also includes one or more physical buttons, such as "home" or menu button 1404. As described previously, menu button 1404 is optionally used to navigate to any application 1336 in a set of applications that are, optionally executed on device 1300. Alternatively, in some examples, the menu button is optionally implemented as a soft key in a GUI displayed on touch screen 1312.

In one example, device 1300 optionally includes touch screen 1312, menu button 1404, push button 1406 for powering the device on/off and locking the device, volume adjustment button(s) 1408, Subscriber Identity Module (SIM) card slot 1410, head set jack 1412, and docking/charging external port 1324. Push button 1406 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative example, device 1300 optionally also accepts verbal input for activation or deactivation of some functions through microphone 1313. Device 1300 also, optionally, includes one or more contact intensity sensors 1365 for detecting intensity of contacts on touch screen 1312 and/or one or more tactile output generators 1367 for generating tactile outputs for a user of device 1300.

FIG. 15 is a block diagram of an exemplary multifunction device with a display and a touch-sensitive surface in accordance with some examples of the disclosure. Device 1500 need not include the display and the touch-sensitive surface, as described above, but rather, in some examples, optionally communicates with the display and the touch-sensitive surface on other devices. Additionally, device 1500 need not be portable. In some examples, device 1500 is optionally a laptop computer, a desktop computer, a tablet computer, a multimedia player device (such as a television or a set-top box), a navigation device, an educational device (such as a child's learning toy), a gaming system, or a control device (e.g., a home or industrial controller). Device 1500 optionally includes one or more processing units (CPU's) 1510, one or more network or other communications interfaces 1560, memory 1570, and one or more communication buses 1520 for interconnecting these components. Communication buses 1520 optionally include circuitry (sometimes called a chipset) that interconnects and controls communications between system components. Device 1500 optionally includes input/output (I/O) interface 1530 comprising display 1540, which is typically a touch screen display. I/O interface 1530 also optionally includes a keyboard and/or mouse (or other pointing device) 1550 and touchpad 1555, tactile output generator 1557 for generating tactile outputs on device 1500 (e.g., similar to tactile output generator(s) 1367 described above with reference to FIG. 13A), sensors 1559 (e.g., optical, acceleration, proximity, touch-sensitive, and/or contact intensity sensors similar to contact intensity sensor(s) 1365 described above with reference to FIG. 13A). Memory 1570 optionally includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 1570 optionally includes one or more storage devices remotely located from CPU(s) 1510. In some examples, memory 1570 optionally stores programs, modules, and data structures analogous to the programs, modules, and data structures stored in memory 1302 of portable or non-portable multifunction device 1300 (FIG. 1A), or a subset thereof. Furthermore, memory 1570 optionally stores additional programs, modules, and data structures not present in memory 1302 of portable or non-portable multifunction device 100. For example, memory 1570 of device 1500 optionally stores drawing module 1580, presentation module 1582, word processing module 1584, website creation module 1586, disk authoring module 1588, and/or spreadsheet module 1590, while memory 1302 of portable or non-portable multifunction device 1300 (FIG. 13A) optionally does not store these modules.

Each of the above identified elements in FIG. 15 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various examples. In some examples, memory 1570 optionally stores a subset of the modules and data structures identified above. Furthermore, memory 1570 optionally stores additional modules and data structures not described above.

Figure 16:
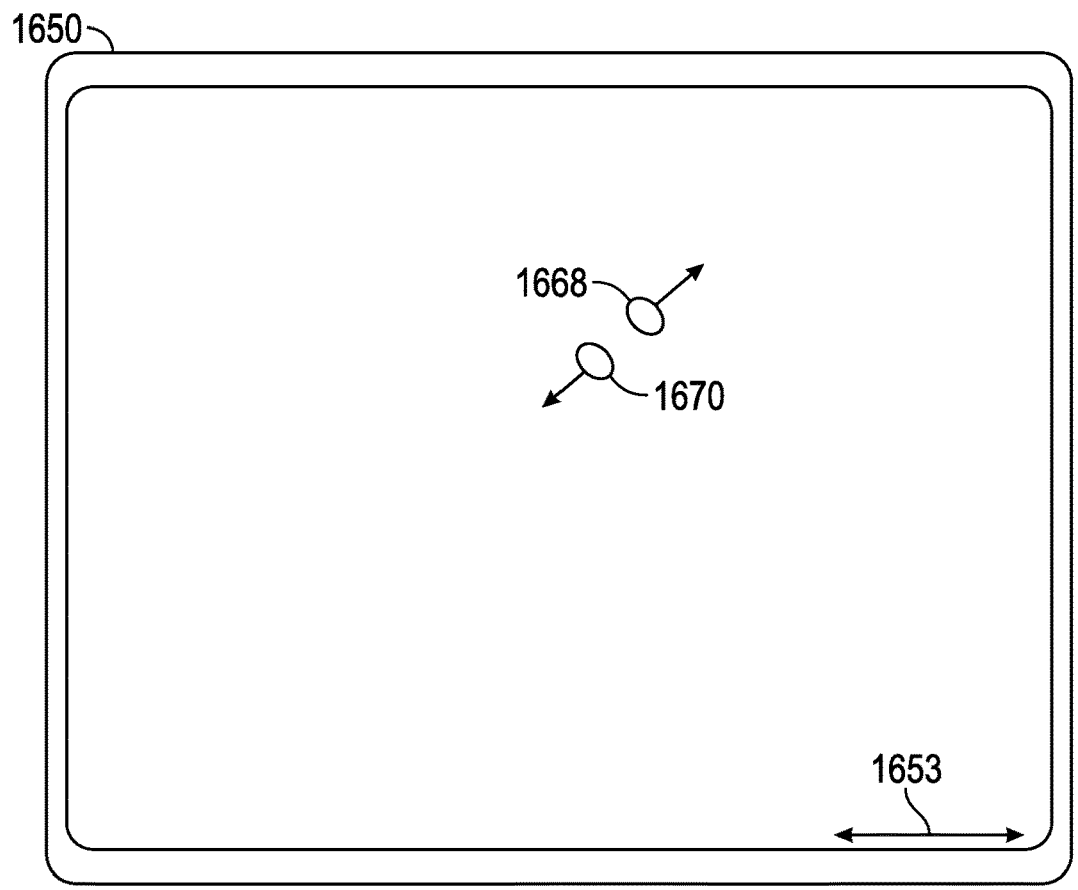
FIG. 16 illustrates an exemplary user interface on a device with a touch-sensitive surface that is separate from the display according to some examples of the disclosure.
Figure 16:
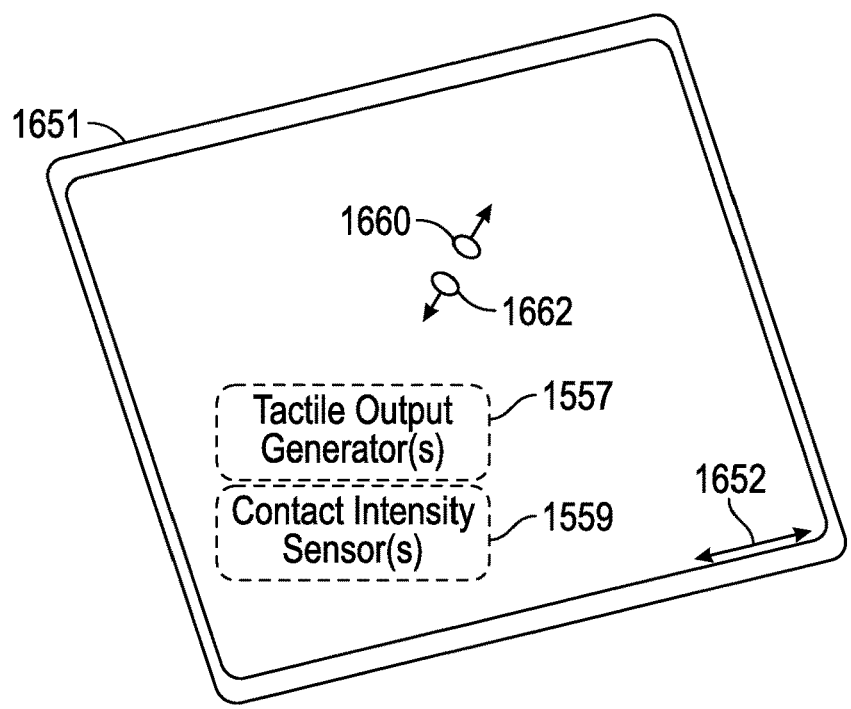

FIG. 16 illustrates an exemplary user interface on a device (e.g., device 1500, FIG. 15) with a touch-sensitive surface 1651 (e.g., a tablet or touchpad 1555, FIG. 15) that is separate from the display 1650 (e.g., touch screen display 1312) according to some examples of the disclosure. Device 1500 also, optionally, includes one or more contact intensity sensors (e.g., one or more of sensors 1557) for detecting intensity of contacts on touch-sensitive surface 1651 and/or one or more tactile output generators 1559 for generating tactile outputs for a user of device 1500.

Although some of the examples which follow will be given with reference to inputs on touch screen display 1312 (where the touch sensitive surface and the display are combined), in some examples, the device optionally detects inputs on a touch-sensitive surface that is separate from the display, as shown in FIG. 16. In some examples, the touch sensitive surface (e.g., 1651 in FIG. 16) optionally has a primary axis (e.g., 1652 in FIG. 16) that corresponds to a primary axis (e.g., 1653 in FIG. 16) on the display (e.g., 1650). In accordance with these examples, the device optionally detects contacts (e.g., 1660 and 1662 in FIG. 16) with the touch-sensitive surface 1651 at locations that correspond to respective locations on the display (e.g., in FIG. 16, 1660 corresponds to 1668 and 1662 corresponds to 1670). In this way, user inputs (e.g., contacts 1660 and 1662, and movements thereof) detected by the device on the touch-sensitive surface (e.g., 1651 in FIG. 16) are optionally used by the device to manipulate the user interface on the display (e.g., 1650 in FIG. 16) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some examples, one or more of the finger inputs are optionally replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor optionally acts as a "focus selector," so that when an input (e.g., a press input) is detected on a touch-sensitive surface (e.g., touchpad 1555 in FIG. 15 or touch-sensitive surface 1651 in FIG. 16) while the cursor is over a particular user interface element (e.g., a button, window, slider or other user interface element), the particular user interface element is optionally adjusted in accordance with the detected input. In some implementations that include a touch-screen display (e.g., touch-sensitive display system 1312 in FIG. 13A or touch screen 1312 in FIG. 14) that enables direct interaction with user interface elements on the touch-screen display, a detected contact on the touch-screen optionally acts as a "focus selector," so that when an input (e.g., a press input by the contact) is detected on the touch-screen display at a location of a particular user interface element (e.g., a button, window, slider or other user interface element), the particular user interface element is optionally adjusted in accordance with the detected input. In some implementations, focus is optionally moved from one region of a user interface to another region of the user interface without corresponding movement of a cursor or movement of a contact on a touch-screen display (e.g., by using a tab key or arrow keys to move focus from one button to another button); in these implementations, the focus selector optionally moves in accordance with movement of focus between different regions of the user interface. Without regard to the specific form taken by the focus selector, the focus selector is optionally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

The user interface figures described below include various intensity diagrams that show the current intensity of the contact on the touch-sensitive surface relative to one or more intensity thresholds (e.g., a contact detection intensity threshold ITO, a light press intensity threshold ITL, a deep press intensity threshold ITD, and/or one or more other intensity thresholds). This intensity diagram is typically not part of the displayed user interface, but is provided to aid in the interpretation of the figures. In some examples, the light press intensity threshold optionally corresponds to an intensity at which the device will perform operations typically associated with clicking a button of a physical mouse or a trackpad. In some examples, the deep press intensity threshold optionally corresponds to an intensity at which the device will perform operations that are different from operations typically associated with clicking a button of a physical mouse or a trackpad. In some examples, when a contact is detected with an intensity below the light press intensity threshold (e.g., and above a nominal contact-detection intensity threshold ITO below which the contact is no longer detected), the device optionally moves a focus selector in accordance with movement of the contact on the touch-sensitive surface without performing an operation associated with the light press intensity threshold or the deep press intensity threshold. Generally, unless otherwise stated, these intensity thresholds are optionally consistent between different sets of user interface figures.

An increase of intensity of the contact from an intensity below the light press intensity threshold ITL to an intensity between the light press intensity threshold ITL and the deep press intensity threshold ITD is sometimes referred to as a "light press" input. An increase of intensity of the contact from an intensity below the deep press intensity threshold ITD to an intensity above the deep press intensity threshold ITD is sometimes referred to as a "deep press" input. An increase of intensity of the contact from an intensity below the contact-detection intensity threshold ITO to an intensity between the contact-detection intensity threshold ITO and the light press intensity threshold ITL is sometimes referred to as detecting the contact on the touch-surface. A decrease of intensity of the contact from an intensity above the contact-detection intensity threshold ITO to an intensity below the contact intensity threshold ITO is sometimes referred to as detecting liftoff of the contact from the touch-surface. In some examples, ITO is zero. In some examples, ITO is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some examples described herein, one or more operations are optionally performed in response to detecting a gesture that includes a respective press input or in response to detecting the respective press input performed with a respective contact (or a plurality of contacts), where the respective press input is optionally detected based at least in part on detecting an increase in intensity of the contact (or plurality of contacts) above a press-input intensity threshold.

In some examples, the respective operation is optionally performed in response to detecting the increase in intensity of the respective contact above the press-input intensity threshold (e.g., a "down stroke" of the respective press input). In some examples, the press input optionally includes an increase in intensity of the respective contact above the press-input intensity threshold and a subsequent decrease in intensity of the contact below the press-input intensity threshold, and the respective operation is optionally performed in response to detecting the subsequent decrease in intensity of the respective contact below the press-input threshold (e.g., an "up stroke" of the respective press input).

In some examples, the device optionally employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some examples, the press input optionally includes an increase in intensity of the respective contact above the press-input intensity threshold and a subsequent decrease in intensity of the contact below the hysteresis intensity threshold that corresponds to the press-input intensity threshold, and the respective operation is optionally performed in response to detecting the subsequent decrease in intensity of the respective contact below the hysteresis intensity threshold (e.g., an "up stroke" of the respective press input). Similarly, in some examples, the press input is optionally detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is optionally performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Therefore, according to the above, some examples of the disclosure are directed to a method of synchronizing content and events in a media stream, comprising: identifying an event in the media stream, the event including one or more time attributes that establish a relative location of the event in the media stream; determining a current display location in the media stream; and determining whether the event is active at the current display location by comparing the current display location to the one or more time attributes of the event. Additionally or alternatively to one or more of the examples disclosed above, in some examples the method further comprises displaying an overlay associated with the active event at a time specified by the event. Additionally or alternatively to one or more of the examples disclosed above, in some examples at least one of the time attributes comprises a video segment identifier that identifies a video segment, and an offset value representing a time from a start of the video segment. Additionally or alternatively to one or more of the examples disclosed above, in some examples if the event is active at the current display location, the method further comprises: determining whether an overlay associated with the event needs to be displayed; determining whether the overlay is ready to be displayed if the event needs to be displayed; and preparing the overlay to be displayed if the overlay is not yet ready to be displayed. Additionally or alternatively to one or more of the examples disclosed above, in some examples the method further comprises displaying a complete overlay at a time specified by the event if there is sufficient time to prepare the complete overlay to be displayed; and displaying an altered overlay at the time specified by the event if there is insufficient time to prepare the complete overlay to be displayed. Additionally or alternatively to one or more of the examples disclosed above, in some examples the media stream contains a re-broadcast of a previously live program, and the method further comprises: displaying overlay information at the time specified by the event, the displayed overlay information corresponding to the overlay information appearing at the time specified by the event when the media stream was originally broadcast. Additionally or alternatively to one or more of the examples disclosed above, in some examples the media stream contains a re-broadcast of a previously live program, and the method further comprises: displaying overlay information at the time specified by the event, the displayed overlay information including information not appearing at the time specified by the event when the media stream was originally broadcast. Additionally or alternatively to one or more of the examples disclosed above, in some examples the method further comprises selectively displaying overlay information at the time specified by the event corresponding to either information appearing at the time specified by the event when the media stream was originally broadcast, or information not appearing at the time specified by the event when the media stream was originally broadcast. Additionally or alternatively to one or more of the examples disclosed above, in some examples the method further comprises periodically examining the media stream to identify new and updated events. Additionally or alternatively to one or more of the examples disclosed above, in some examples at least one of the time attributes comprises a duration value representing a duration of the event in the media stream. Additionally or alternatively to one or more of the examples disclosed above, in some examples the method further comprises: identifying an advertisement in the media stream, the advertisement including one or more time attributes that establish a time delay created by the advertisement; and updating the duration value based on the time delay.

Some examples of the disclosure are directed to a device for synchronizing content and events in a media stream, comprising: a network interface for receiving the media stream; and a processor communicatively coupled to the network interface and capable of identifying an event in the media stream, the event including one or more time attributes that establish a relative location of the event in the media stream, determining a current display location in the media stream, and determining whether the event is active at the current display location by comparing the current display location to the one or more time attributes of the event. Additionally or alternatively to one or more of the examples disclosed above, in some examples the processor is further capable of displaying an overlay associated with the active event at a time specified by the event. Additionally or alternatively to one or more of the examples disclosed above, in some examples at least one of the time attributes of the event comprises a video segment identifier that identifies a video segment, and an offset value representing a time from a start of the video segment. Additionally or alternatively to one or more of the examples disclosed above, in some examples if the event is active at the current display location, the processor is further capable of: determining whether an overlay associated with the event needs to be displayed; determining whether the overlay is ready to be displayed if the event needs to be displayed; and preparing the overlay to be displayed if the overlay is not yet ready to be displayed. Additionally or alternatively to one or more of the examples disclosed above, in some examples the processor is further capable of: displaying a complete overlay at a time specified by the event if there is sufficient time to prepare the complete overlay to be displayed; and displaying an altered overlay at the time specified by the event if there is insufficient time to prepare the complete overlay to be displayed. Additionally or alternatively to one or more of the examples disclosed above, in some examples the media stream contains a re-broadcast of a previously live program, and the processor is further capable of: displaying overlay information at the time specified by the event, the displayed overlay information corresponding to the overlay information appearing at the time specified by the event when the media stream was originally broadcast. Additionally or alternatively to one or more of the examples disclosed above, in some examples the media stream contains a re-broadcast of a previously live program, and the processor is further capable of: displaying overlay information at the time specified by the event, the displayed overlay information including information not appearing at the time specified by the event when the media stream was originally broadcast. Additionally or alternatively to one or more of the examples disclosed above, in some examples the processor is capable of selectively displaying overlay information at the time specified by the event corresponding to either information appearing at the time specified by the event when the media stream was originally broadcast, or information not appearing at the time specified by the event when the media stream was originally broadcast. Additionally or alternatively to one or more of the examples disclosed above, in some examples the processor capable of periodically examining the media stream to identify new and updated events.

Some examples of the disclosure are directed to a non-transitory computer-readable storage medium containing instructions that, when executed, perform a method for synchronizing content and events in a media stream, the method comprising: identifying an event in the media stream, the event including one or more time attributes that establish a relative location of the event in the media stream; determining a current display location in the media stream; and determining whether the event is active at the current display location by comparing the current display location to the one or more time attributes of the event. Additionally or alternatively to one or more of the examples disclosed above, in some examples the method further comprises displaying an overlay associated with the active event at a time specified by the event. Additionally or alternatively to one or more of the examples disclosed above, in some examples at least one of the time attributes comprises a video segment identifier that identifies a video segment, and an offset value representing a time from a start of the video segment.

Some examples of the disclosure are directed to a method of updating a stream timeline associated with a media stream, comprising: receiving the stream timeline; receiving a master clock associated with the media stream; computing a difference between the stream timeline with the master clock; and updating the stream timeline in accordance with the computed difference. Additionally or alternatively to one or more of the examples disclosed above, in some examples the stream timeline is representative of a calculated elapsed time of a program in the media stream, and wherein the master clock is representative of an actual elapsed time of a program in the media stream.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A method comprising:
    at an electronic device in communication with a display:
        receiving a media stream;
        identifying an event in the media stream, the event associated with first time metadata that establishes a relative location of the event in the media stream and a duration of the event in the media stream, wherein the event is associated with a respective overlay for display;
        identifying an advertisement in the media stream, the advertisement including second time metadata that establishes a time delay created by the advertisement; and
        in accordance with a determination that a location of the advertisement in the media stream is within the duration of the event:
            updating the first time metadata of the event based on the time delay created by the advertisement; and
            displaying, via the display, the respective overlay over the media stream based on the updated first time metadata of the event.

2. The method of claim 1, wherein updating the first time metadata of the event based on the time delay created by the advertisement includes utilizing a master clock provided by an entity other than a provider of the media stream to update the first time metadata of the event.

3. The method of claim 2, wherein updating the first time metadata of the event based on the time delay created by the advertisement includes utilizing a difference between a timeline of the media stream and the master clock to update the first time metadata of the event.

4. The method of claim 1, wherein updating the first time metadata of the event based on the time delay created by the advertisement occurs before displaying, on the display, a portion of the media stream that corresponds to the event.

5. The method of claim 1, wherein displaying the respective overlay over the media stream comprises:
    in accordance with a determination that there is sufficient time, before a time specified by the event, to prepare a complete overlay to be displayed at the time specified by the event, displaying the complete overlay; and in accordance with a determination that there is insufficient time, before the time specified by the event, to prepare the complete overlay to be displayed at the time specified by the event, displaying an altered overlay at the time specified by the event.

6. The method of claim 5, wherein:

displaying the complete overlay includes displaying the overlay with a visual effect, and displaying the altered overlay includes displaying the overlay without the visual effect.

7. The method of claim 1, wherein the first time metadata associated with the event comprises a video segment identifier that identifies a video segment, and an offset value representing a time from a start of the video segment.

8. The method of claim 1, wherein displaying the respective overlay over the media stream comprises:

in accordance with a determination that the media stream contains a re-broadcast of a previously live program, displaying overlay information at a time specified by the event, the displayed overlay information including information appearing during the event when the media stream was originally broadcast.

9. The method of claim 1, wherein displaying the respective overlay over the media stream comprises:

in accordance with a determination that the media stream contains a re-broadcast of a previously live program, displaying overlay information at a time specified by the event, the displayed overlay information including information not appearing during the event when the media stream was originally broadcast.

10. The method of claim 1, wherein displaying the respective overlay over the media stream comprises dynamically obtaining, by the electronic device, from a first source outside of the electronic device, one or more overlay applications corresponding to the respective overlay associated with the event, and the media stream is received from a second source, different from the first source, outside of the electronic device.

11. A non-transitory computer-readable storage medium including instructions, configured to be executed by an electronic device in communication with a display, for:

receiving a media stream;

identifying an event in the media stream, the event associated with first time metadata that establishes a relative location of the event in the media stream and a duration of the event in the media stream, wherein the event is associated with a respective overlay for display;

identifying an advertisement in the media stream, the advertisement including second time metadata that establishes a time delay created by the advertisement; and in accordance with a determination that a location of the advertisement in the media stream is within the duration of the event:

updating the first time metadata of the event based on the time delay created by the advertisement; and displaying, via the display, the respective overlay over the media stream based on the updated first time metadata of the event.

12. A device comprising:

one or more processors; and memory storing instructions, configured to be executed by the one or more processors, for:

receiving a media stream;

identifying an event in the media stream, the event associated with first time metadata that establishes a relative location of the event in the media stream and a duration of the event in the media stream, wherein the event is associated with a respective overlay for display;

identifying an advertisement in the media stream, the advertisement including second time metadata that establishes a time delay created by the advertisement; and in accordance with a determination that a location of the advertisement in the media stream is within the duration of the event:

updating the first time metadata of the event based on the time delay created by the advertisement; and displaying, via a display, the respective overlay over the media stream based on the updated first time metadata of the event.

13. The non-transitory computer-readable storage medium of claim 11, wherein updating the first time metadata of the event based on the time delay created by the advertisement includes utilizing a master clock provided by an entity other than a provider of the media stream to update the first time metadata of the event.

14. The non-transitory computer-readable storage medium of claim 13, wherein updating the first time metadata of the event based on the time delay created by the advertisement includes utilizing a difference between a timeline of the media stream and the master clock to update the first time metadata of the event.

15. The non-transitory computer-readable storage medium of claim 11, wherein updating the first time metadata of the event based on the time delay created by the advertisement occurs before displaying, on the display, a portion of the media stream that corresponds to the event.

16. The non-transitory computer-readable storage medium of claim 11, wherein displaying the respective overlay over the media stream comprises:

in accordance with a determination that there is sufficient time, before a time specified by the event, to prepare a complete overlay to be displayed at the time specified by the event, displaying the complete overlay; and in accordance with a determination that there is insufficient time, before the time specified by the event, to prepare the complete overlay to be displayed at the time specified by the event, displaying an altered overlay at the time specified by the event.

17. The non-transitory computer-readable storage medium of claim 16, wherein:

displaying the complete overlay includes displaying the overlay with a visual effect, and displaying the altered overlay includes displaying the overlay without the visual effect.

18. The non-transitory computer-readable storage medium of claim 11, wherein the first time metadata associated with the event comprises a video segment identifier that identifies a video segment, and an offset value representing a time from a start of the video segment.

19. The non-transitory computer-readable storage medium of claim 11, wherein displaying the respective overlay over the media stream comprises:

in accordance with a determination that the media stream contains a re-broadcast of a previously live program, displaying overlay information at a time specified by the event, the displayed overlay information including information appearing during the event when the media stream was originally broadcast.

20. The non-transitory computer-readable storage medium of claim 11, wherein displaying the respective overlay over the media stream comprises:

in accordance with a determination that the media stream contains a re-broadcast of a previously live program, displaying overlay information at a time specified by the event, the displayed overlay information including information not appearing during the event when the media stream was originally broadcast.

21. The non-transitory computer-readable storage medium of claim 11, wherein displaying the respective overlay over the media stream comprises dynamically obtaining, by the electronic device, from a first source outside of the electronic device, one or more overlay applications corresponding to the respective overlay associated with the event, and the media stream is received from a second source, different from the first source, outside of the electronic device.

22. The electronic device of claim 12, wherein updating the first time metadata of the event based on the time delay created by the advertisement includes utilizing a master clock provided by an entity other than a provider of the media stream to update the first time metadata of the event.

23. The electronic device of claim 22, wherein updating the first time metadata of the event based on the time delay created by the advertisement includes utilizing a difference between a timeline of the media stream and the master clock to update the first time metadata of the event.

24. The electronic device of claim 12, wherein updating the first time metadata of the event based on the time delay created by the advertisement occurs before displaying, on the display, a portion of the media stream that corresponds to the event.

25. The electronic device of claim 12, wherein displaying the respective overlay over the media stream comprises:

in accordance with a determination that there is sufficient time, before a time specified by the event, to prepare a complete overlay to be displayed at the time specified by the event, displaying the complete overlay; and in accordance with a determination that there is insufficient time, before the time specified by the event, to prepare the complete overlay to be displayed at the time specified by the event, displaying an altered overlay at the time specified by the event.

26. The electronic device of claim 25, wherein:

displaying the complete overlay includes displaying the overlay with a visual effect, and displaying the altered overlay includes displaying the overlay without the visual effect.

27. The electronic device of claim 12, wherein the first time metadata associated with the event comprises a video segment identifier that identifies a video segment, and an offset value representing a time from a start of the video segment.

28. The electronic device of claim 12, wherein displaying the respective overlay over the media stream comprises:

in accordance with a determination that the media stream contains a re-broadcast of a previously live program, displaying overlay information at a time specified by the event, the displayed overlay information including information appearing during the event when the media stream was Newly broadcast.

29. The electronic device of claim 12, wherein displaying the respective overlay over the media stream comprises:

in accordance with a determination that the media stream contains a re-broadcast of a previously live program, displaying overlay information at a time specified by the event, the displayed overlay information including information not appearing during the event when the media stream was originally broadcast.

30. The electronic device of claim 12, wherein displaying the respective overlay over the media stream comprises dynamically obtaining, by the electronic device, from a first source outside of the electronic device, one or more overlay applications corresponding to the respective overlay associated with the event, and the media stream is received from a second source, different from the first source, outside of the electronic device.

* * * * *

UNITED STATES PATENT AND TRADEMARK OFFICE
CERTIFICATE OF CORRECTION

PATENT NO. : 11,190,856 B2
APPLICATION NO. : 16/723985
DATED : November 30, 2021
INVENTOR(S) : William M. Bumgarner et al.

Page 1 of 1

It is certified that error appears in the above-identified patent and that said Letters Patent is hereby corrected as shown below:

In the Claims

In Column 41, Line 19, in Claim 22, before "device of" delete "electronic".

In Column 41, Line 24, in Claim 23, before "device of" delete "electronic".

In Column 41, Line 29, in Claim 24, before "device of" delete "electronic".

In Column 41, Line 34, in Claim 25, before "device of" delete "electronic".

In Column 42, Line 6, in Claim 26, before "device of" delete "electronic".

In Column 42, Line 11, in Claim 27, before "device of" delete "electronic".

In Column 42, Line 16, in Claim 28, before "device of" delete "electronic".

In Column 42, Line 23, in Claim 28, delete "Newly" and insert --newly--.

In Column 42, Line 24, in Claim 29, before "device of" delete "electronic".

In Column 42, Line 32, in Claim 30, before "device of" delete "electronic".

Signed and Sealed this
Eleventh Day of October, 2022

Katherine Kelly Vidal
*Director of the United States Patent and Trademark Office*